United States Patent
Coates et al.

(10) Patent No.: US 10,711,101 B2
(45) Date of Patent: Jul. 14, 2020

(54) ISOTACTIC POLYETHERS AND BIMETALLIC CATALYSTS, METHODS OF MAKING SAME, AND USES THEREOF

(71) Applicant: CORNELL UNIVERSITY, Ithaca, NY (US)

(72) Inventors: Geoffrey W. Coates, Lansing, NY (US); Matthew Ian Childers, Pasco, WA (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 15/525,731

(22) PCT Filed: Nov. 11, 2015

(86) PCT No.: PCT/US2015/060145
§ 371 (c)(1),
(2) Date: May 10, 2017

(87) PCT Pub. No.: WO2016/077455
PCT Pub. Date: May 19, 2016

(65) Prior Publication Data
US 2017/0335061 A1    Nov. 23, 2017

Related U.S. Application Data

(60) Provisional application No. 62/078,168, filed on Nov. 11, 2014.

(51) Int. Cl.
*C08G 65/12* (2006.01)
*C08G 65/26* (2006.01)
*C07F 11/00* (2006.01)

(52) U.S. Cl.
CPC ............ *C08G 65/12* (2013.01); *C07F 11/005* (2013.01); *C08G 65/266* (2013.01); *C08G 65/2606* (2013.01); *C08G 65/2636* (2013.01)

(58) Field of Classification Search
CPC ... C07F 11/005; C08G 65/12; C08G 65/2606; C08G 65/2636; C08G 65/266
See application file for complete search history.

(56) References Cited

U.S. PATENT DOCUMENTS

| | | | |
|---|---|---|---|
| 7,981,992 B2 | 7/2011 | Arriola et al. | |
| 8,039,655 B2 | 10/2011 | Coates et al. | |
| 8,759,453 B2 | 6/2014 | Clark et al. | |
| 9,365,674 B2 * | 6/2016 | Coates | C08G 18/4825 |
| 2014/0179895 A1 | 6/2014 | Coates et al. | |

FOREIGN PATENT DOCUMENTS

| | | | |
|---|---|---|---|
| WO | 2008/024363 A2 | 2/2008 | |
| WO | 2012/166889 A2 | 12/2012 | |
| WO | WO-2012166889 A2 * | 12/2012 | C08G 18/4825 |

OTHER PUBLICATIONS

Liu et al., "Binuclear chromium-salan complex catalyzed alternating copolymerization of epoxides and cyclic anhydrides," Polym. Chem., 2013, 4, 1439.*

* cited by examiner

Primary Examiner — Rosalynd A Keys
(74) Attorney, Agent, or Firm — Hodgson Russ LLP

(57) ABSTRACT

Provided are compositions comprising isotactic polyethers. Methods of making isotactic polyethers, and uses thereof are also disclosed. Also provided are bimetallic complexes that can be used as catalyst. Methods of making isotactic polyethers and bimetallic complexes and uses thereof are also disclosed. For example, a racemic bimetallic (salalen) CrCl polymerization catalyst was prepared and used alkyl diol, PO-oligomer triols, and aPPO and PCL diols as CSAs in order to produce α,ω-hydroxy telechelic iPPO. These telechelic polymers have controlled molecular weights and are semicrystalline. Amorphous α,ω-hydroxy telechelic PPO can also be produced by increasing the reaction temperature in conjunction with the use of CSAs.

22 Claims, 13 Drawing Sheets

ISOTACTIC POLYETHERS AND BIMETALLIC CATALYSTS, METHODS OF MAKING SAME, AND USES THEREOF

CROSS-REFERENCE TO RELATED APPLICATIONS

This application claims priority to the provisional patent application filed Nov. 11, 2014, assigned U.S. App. No. 62/078,168, the disclosure of which is hereby incorporated by reference.

STATEMENT REGARDING FEDERALLY SPONSORED RESEARCH

This invention was made with government support under grant no. N00014-14-1-0551 awarded by the Office of Naval Research. The government has certain rights in the invention.

BACKGROUND OF THE DISCLOSURE

α,ω-Hydroxy telechelic poly(propylene oxide) (PPO) is widely used industrially as a midsegment in polyurethane synthesis. These polymers have been produced from racemic propylene oxide using chain shuttling agents and double-metal cyanide catalysts that produce atactic polymers. Unlike atactic PPO, isotactic PPO is semicrystalline with a melting temperature of approximately 67° C. Currently there is no practical route to α,ω-hydroxy telechelic isotactic PPO using racemic propylene oxide.

Polymers with reactive end-groups are useful materials as they can be readily integrated into more complicated macromolecular assemblies in a well-defined manner. For example, low molecular weight polymers with multiple terminal hydroxy groups (α,ω-hydroxy telechelic polymers, also known as "polyols") react with multi-functional isocyanates to form polyurethanes, a class of polymers with an estimated production of 17 billion pounds in 2010 (~5% of worldwide polymer production) that are used to form a large variety of products such as soft and rigid foams, adhesives, and elastomers. The functionality (i.e., the number of hydroxyl groups) of the polyol used affects the polyurethane product. Diols produce linear polyurethanes when reacted with diisocyanates, while polyols with functionality greater than two produce cross-linked polyurethanes. Atactic poly(propylene oxide) (aPPO) polyols are commonly used due to their low cost and the desirable properties they impart to the final polyurethane.

Numerous catalysts capable of the stereorandom polymerization of propylene oxide (PO) are known, but only alkali hydroxide and double-metal cyanide (DMC) catalysts are commonly used industrially. While aPPO diols can be prepared from hydroxyl initiators, the main route to aPPO polyols uses protic chain shuttling agents (CSAs) that give polyols with the same functionality as the parent CSA. CSAs are reagents that allow for the production of multiple polymer chains per catalyst center and control of polymer molecular weight by varying the monomer to CSA ratio. They function by reacting with a propagating polymer chain at a catalytic center to produce a new propagating polymer chain and a latent polymer chain, which can later behave as a CSA and reinitiate propagation, such as the addition of alcohols to the polymerization of PO with (tetraphenylporphinato)aluminum chloride catalysts led to lower molecular weight polymers with ether and hydroxyl end-groups, an "immortal polymerization."

Similar to polypropylene, atactic PPO is amorphous with a $T_g$ of approximately −70° C., while isotactic PPO (iPPO) is a semicrystalline solid with a $T_m$ of approximately 67° C. Unlike polypropylene, however, the production of iPPO is more challenging than that of aPPO, severely limiting investigations into its applications. There are three routes to iPPO. In route A, enantiopure PO is polymerized in a regioregular fashion. Unfortunately, the high cost of enantiopure PO renders this approach uneconomical. In route B, a chiral, enantioselective catalyst polymerizes rac-PO to give enantiopure iPPO and unreacted, enantiopure PO of the opposite stereoconfiguration. While our group has prepared enantiopure bimetallic (salen)Co(III) catalysts for this transformation, most reported epoxide polymerization catalysts are achiral or suffer from low enantioselectivities. Route C is similar to route B, except with a chiral, racemic catalyst that is used to form isotactic polymer chains from both enantiomers of the epoxide. This route is especially appealing for the large-scale production of iPPO, as all of the PO can be polymerized in one step and the stereoregularity of the polymer is not degraded as conversion to polymer increases. Although numerous heterogenous catalysts are known to produce a mixture of iPPO and aPPO chains, there are only a few catalysts capable of solely producing iPPO chains, including (salph)Co(III) complexes and homogenous racemic bimetallic (salen)Co(III) complexes.

Only a few reports of α,ω-hydroxy telecheclic iPPO and their use as polyurethane midsegments have been disclosed, mostly from chain-scission of high molecular weight iPPO produced from partially-isoselective heterogeneous catalysts. Generally, mixtures of iPPO and aPPO were reported to be useful polyurethane midsegments for flexible foams and elastomers, while using solely iPPO imparted improved properties to rigid polyurethane foams. An early study on polyurethane peel strengths and rigidity found that a 3000 Da 40% isotactic PPO diol produced a polyurethane with higher peel strength and rigidity than its atactic counterpart. A tin phosphate condensate catalyst has been reported for the production of telechelic iPPO, but the resulting polymers have levels of mm-triad content ([mm]) below 60% and broad molecular weight distributions (2.4-4.6). Furthermore, preparation of the catalyst requires fractionation, and isolation of the isotactic polymer product necessitates removal of atactic polymer and other side-products. Tokunaga et al. reported in a patent that semicrystalline diol iPPOs can be formed by polymerizing PO with the (salph)Co(III) catalyst and related compounds in the presence of acetic acid and then hydrolyzing the resulting acetate end-groups with KOH. The molecular weights of these polymers are controlled by the amounts of catalyst and acetic acid used, though it is not clear if the acetic acid controls the molecular weight by acting as a CSA or through other means, as the ratio of PO to acetic acid (~6) is too low for the molecular weights produced (~2600 Da) if all of the acetic acid functions as a CSA. The solid-state nature of the (salph)Co(III) catalyst is also not addressed.

SUMMARY OF THE DISCLOSURE

Provided are synthetically accessible, bimetallic complexes, such as bimetallic chromium complexes, that can, for example, catalyze the polymerization of racemic epoxides to isotactic polyethers. Ligands for the catalyst can be prepared in a one-pot procedure with no chromatography steps for both the enantiopure and racemic forms.

For example, a bimetallic complex (e.g., a catalyst) has one of the following structures:

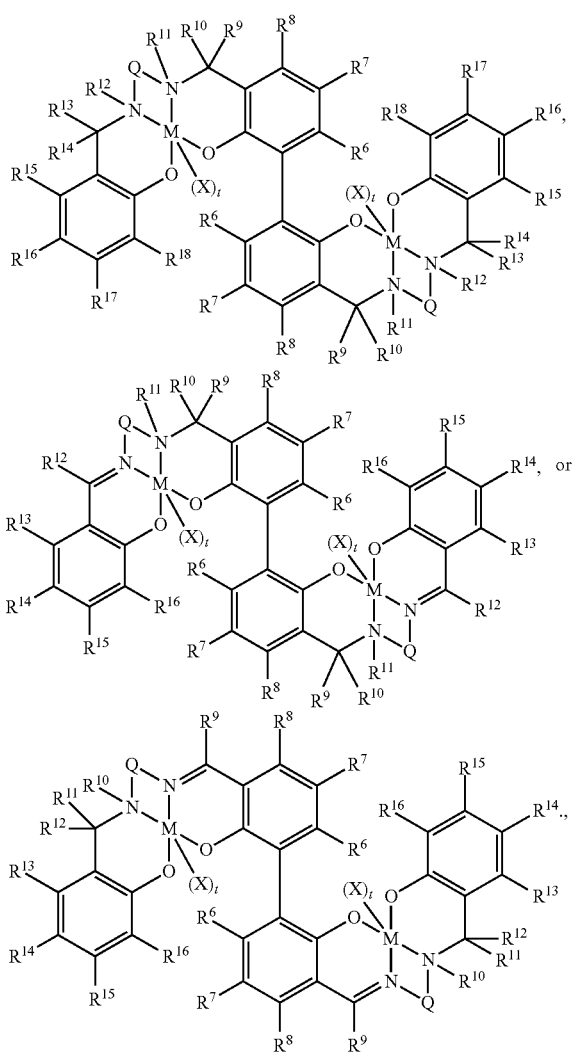

where M is a metal, X is a nucleophile or counterion, t is an integer from 0 to 2, Q is $C_1$ to $C_{20}$ aliphatic group, $C_5$ to $C_{20}$ aliphatic carbocyclic group, and each $R^6$ through $R^{18}$ independently are selected from the group consisting of hydrogen, $C_1$ to $C_{20}$ aliphatic group, halide, $C_1$ to $C_{20}$ alkoxide group, $C_6$ to $C_{20}$ aryl group. Optionally, adjacent $R^6$, $R^7$, $R^8$, $R^9$, $R^{10}$, $R^{11}$, $R^{12}$, $R^{13}$, $R^{14}$, $R^{15}$, $R^{16}$, $R^{17}$, or $R^{18}$ groups taken together with their intervening atoms to form a saturated, partially unsaturated, or aromatic 5 to 12 membered ring containing 0 to 4 heteroatoms, 5 to 6 membered carbocyclic group, aryl group, or 5 to 7-membered heteroaryl group, wherein the rings or groups are substituted.

Also provided are polymers comprising one or more isotactic polyether groups. For example, a polymer comprises the following structure:

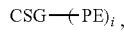

where CSG is a chain shuttling group and PE is an isotactic polyether group, i is the number of polyether groups. The mm-triad content of the isotactic polyether group is less than or equal to 94% and/or the mr-triad+rm-triad is greater than or equal to 2 times the rr-triad, and the $M_n$ of the polymer can be from 500 to 500,000 g/mol.

Also provided are methods of making polymers of the present disclosure. Bimetallic complexes of the present disclosure can be used to polymerize an epoxide to provide a polymer comprising one or more polyether group.

For example, a method of making a polymer of the present disclosure comprises: polymerizing an epoxide in the presence of a bimetallic metal complex catalyst and one or more ionic co-catalyst and/or one or more chain shuttling agent. Chain shuttling agents can be used to prepare isotactic, semicrystalline polymers with one or more hydroxyl end-groups using racemic catalysts.

In addition to propylene oxide, other racemic or enantiopure epoxides that can be polymerized via a method of the present disclosure include, but are not limited, to 1-butene oxide, 1-hexene oxide, 1-octene oxide, butadiene monoepoxide, phenyl glycidyl ether, methyl glycidyl ether, ethyl glycidyl ether, n-butyl glycidyl ether, allyl glycidyl ether, and epichlorhydrin. In addition to the chromium catalyst, FIG. 4 represents other, but not all other, catalysts that can be used to polymerize epoxides via the methods reported in this disclosure.

While not required, ionic cocatalysts can also be included in the reaction to polymerize epoxides in conjunction with the catalysts reported in this disclosure include, but are not limited to, PPNCl and other PPN salts, phosphonium salts, phosphazenium salts, ammonium salts, and imidazolium salts, some of which are depicted in FIG. 5. If used, these cocatalysts can increase the rate of the polymerization.

In the present disclosure, α,ω-hydroxy telechelic isotactic PPO is synthesized from racemic propylene oxide with control of molecular weight using enantioselective and isoselective bimetallic catalysts in conjunction with chain shuttling agents. An easily accessible bimetallic chromium catalyst is disclosed and can be used to catalyze this transformation. For example, diol, triol, and polymeric chain shuttling agents are used to give α,ω-hydroxy telechelic isotactic PPO of varying functionality and structure.

Also provided are materials comprising one or more polymer of the present disclosure or a moiety derived from one of those polymers. For example, the material comprises a polyurethane, elastomer, thermoset plastic, or thermoplastic, where the polyurethane, elastomer, thermoset plastic, or thermoplastic comprises one or more polymer of the present disclosure or a moiety derived from one of those polymers.

DETAILED DESCRIPTION OF THE DISCLOSURE

Figure 1:
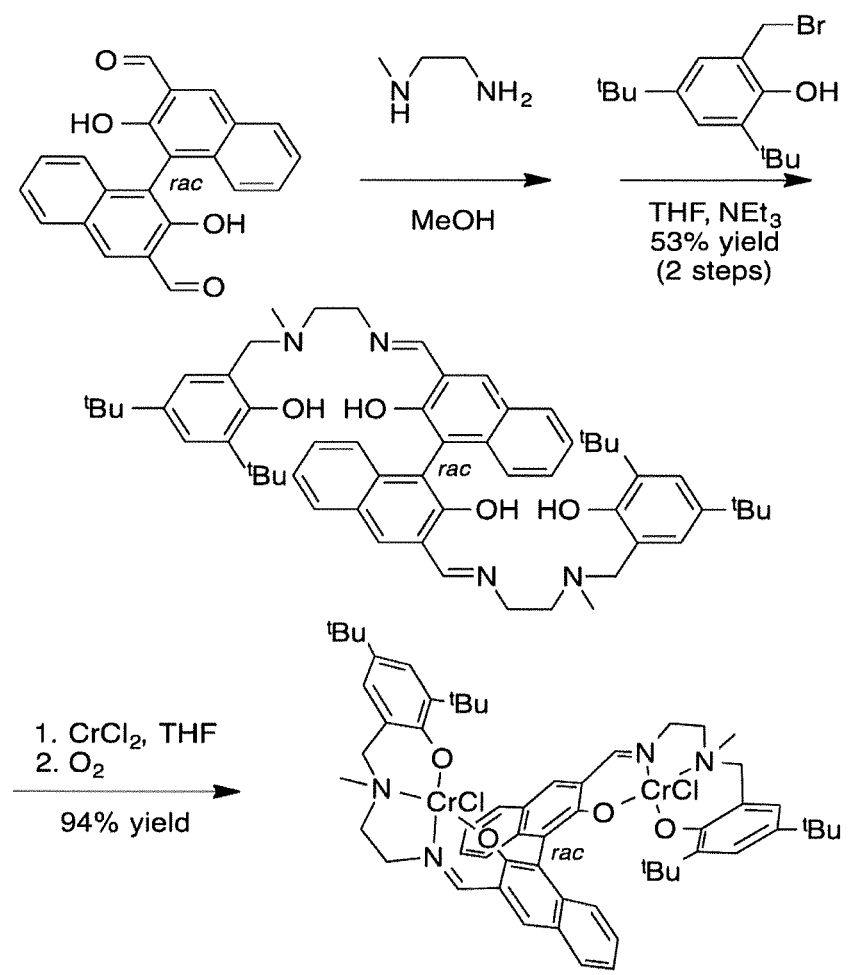
FIG. 1. Synthesis of the bimetallic N-Me-ethylenediamine(salalen)CrCl catalyst.

The present disclosure provides polymers comprising polyether groups (e.g., poly(propylene oxide) (PPO)), methods of making such polymers, and uses of such polymers. The polymers are isotactic. The methods of making the polyethers use a monofunctional chain shuttling agent or a multifunctional chain shuttling agent.

The present disclosure is based on the surprising and unexpected result that a catalyst/co-catalyst system used to synthesize isotactic polyethers can provide tacticity of 94% or less and/or the mr-triad+rm-triad is greater than or equal to 2 times the rr-triad. For example, isotactic poly(propylene oxide) polymers can be formed from racemic poly(propylene oxide) (PPO).

As used herein, unless otherwise expressly stated, "aliphatic group" refers to branched or unbranched hydrocarbons and is meant to include alkanes, alkenes, and alkynes. For example, the aliphatic group is a $C_1$ to $C_{20}$ aliphatic group. The aliphatic group can be a alkyl group such as a methyl group, ethyl group, n-propyl group, i-propyl group, n-butyl group, i-butyl group, s-butyl group, pentyl group, hexyl group, nonyl group, or decyl group. The aliphatic group can be unsubstituted or substituted with groups such as halides (—F, —Cl, —Br, and —I), alkenes, alkynes, aliphatic groups, aryl groups, alkoxides, carboxylates, carboxylic acids, and ether groups.

As used herein, unless otherwise expressly stated, "heteroaliphatic group", refers to a hydrocarbon moiety that can be linear or branched and may be completely saturated or may contain one or more units of unsaturation and contains at least one heteroatom selected from the group consisting of sulfur, nitrogen, and oxygen. Unless otherwise specified, heteroaliphatic groups contain 1 to 12 carbon atoms. Suitable heteroaliphatic groups include halides (—F, —Cl, —Br, —I), alkenes, alkynes, aliphatic groups, aryl groups, alkoxides, carboxylates, carboxylic acids, and ether groups.

As used herein, unless otherwise expressly stated, "carbocyclic group" refers to a cyclic compound having a ring in which all of the atoms forming the ring are carbon atoms. The carbocyclic group can be aromatic or nonaromatic, and include compounds that are saturated, partially unsaturated, or fully unsaturated. The carbocyclic group can contain one or more rings. Examples of such groups include phenyl, substituted phenyl rings (aryl, halides, alkyl chains in the ortho position, meta position, para position, or combinations thereof), and carbocyclic (e.g., hexyl and pentyl). For example, the carbocyclic ring is a $C_3$ to $C_{12}$ carbocyclic ring, including all integer numbers of carbons and ranges of numbers of carbons therebetween. The carbocyclic ring can be unsubstituted or substituted with groups such as, halides (—F, —Cl, —Br, —I), alkenes, alkynes, aliphatic groups, aryl groups, alkoxides, carboxylates, carboxylic acids, and ether groups. As used herein, unless otherwise expressly stated, "aryl group" refers to a "carbocyclic group" that is aromatic. The aryl group can be substituted in the same manner as the carbocyclic group.

As used herein, unless otherwise expressly stated, "aliphatic carbocyclic group" refers to a group having an aliphatic group-carbocyclic group-aliphatic group structure, aliphatic group-carbocyclic group, or carbocyclic group-aliphatic group structure. For example, the aliphatic carbocyclic group is a $C_5$ to $C_{20}$ aliphatic carbocyclic group, where the aliphatic group(s) have the number of carbons remaining after accounting for the number of carbons in the carbocyclic group.

As used herein, unless otherwise expressly stated, "heterocyclic group" refers to a cyclic compound having one or more rings where at least one of the atoms forming the ring(s) is a heteroatom (e.g., O, N, S, etc.). The heterocyclic group can be aromatic or nonaromatic, and include compounds that are saturated, partially unsaturated, and fully unsaturated. For example, the heterocyclic group is a $C_3$ to $C_{12}$ heterocyclic group, including all integer numbers of carbons and ranges of numbers of carbons therebetween. The heterocyclic ring can be unsubstituted or substituted with groups such as, for example, halides (—F, —Cl, —Br, —I), alkenes, alkynes, aliphatic groups, aryl groups, alkoxides, carboxylates, carboxylic acids, and ether groups. As used herein, unless otherwise expressly stated, "heteroaryl group" refers to a "heterocyclic group" that is aromatic. The heteroaryl group can be substituted in the same manner as the heterocyclic group.

As used herein, unless otherwise expressly stated, "aliphatic heterocyclic group" refers to a group having an aliphatic group-heterocyclic group-aliphatic group structure, aliphatic group-heterocyclic group, or heterocyclic group-aliphatic group structure. For example, the aliphatic carbocyclic group is a $C_5$ to $C_{20}$ aliphatic heterocyclic group, where the aliphatic group(s) have the number of carbons remaining after accounting for the number of carbons in the heterocyclic group.

In an aspect, the present disclosure provides polymers comprising polyether groups. As used herein, "polyether" refers to polymers and polymer groups that contain a plurality of ether linkages formed from ring opened epoxides and contain a chain shuttling group formed from a chain shuttling agent (e.g., the polymer group and chain shuttling group forming ether or ester linkages). The polyether polymer can terminate in an alcohol or ether linkage. For example, the polyether is polypropylene oxide. Polymers comprising polyether groups can be made by methods described herein.

The disclosure provides a polymer comprising the following structure:

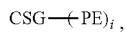

where CSG is a chain shuttling group and PE is an isotactic polyether group. For example, the value of i is 1 to 10 (e.g., 1, 2, 3, 4, 5, 6, 7, 8, 9, or 10). The mm-triad content of the isotactic polyether group is less than or equal to 94% and/or the mr-triad+rm-triad is greater than or equal to 2 times the rr-triad. The $M_n$ of the polymer is 500 to 500,000 g/mol.

The isotactic polyether group can comprise a variety of polyethers. For example, the isotactic polyether group is polypropylene oxide, polybutylene oxide, polyhexene oxide, polyoctene oxide, polybutadiene oxide, and polymers of phenyl glycidyl ether, methyl glycidyl ether, ethyl glycidyl ether, n-butyl glycidyl ether, allyl glycidyl ether, and epichlorhydrin.

CSGs can be internal or terminal groups of the isotactic polyether groups. In an embodiment the CSG is an internal group of the polyether. Examples of CSG groups include:

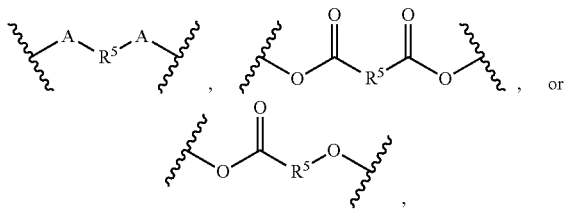, or where A is O or S, $R^5$ is a $C_1$ to $C_{20}$ carbon-containing group such as, for example, a $C_1$ to $C_{20}$ aliphatic group, $C_1$ to $C_{20}$ heteroaliphatic group, $C_3$ to $C_{12}$ carbocyclic group, a $C_5$ to $C_{20}$ aliphatic carbocyclic group, $C_3$ to $C_{12}$ heterocyclic group, or a $C_5$ to $C_{20}$ aliphatic heterocyclic group. The terminal group of a CSG that is not covalently bound to an isotactic polyether group can be —H. The resulting terminal —OH group can be derivitized or used in a polymerization reaction, e.g., a polyurethane polymerization to form a polyurethane comprising a polymer of the present disclosure.

CSGs can be derived from chain shuttling agents (CSAs). For example, a diol CSA gives a diol CSG:

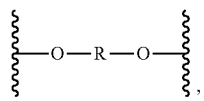

a monoalcohol CSA gives a monoalcohol CSG:

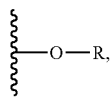

a diacid CSA gives a diacid CSG:

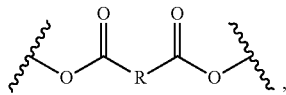

and a hydroxyacid CSA gives a hydroxyacid CSG:

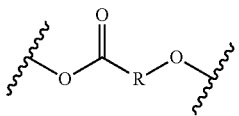

The terminal groups of a polymer (e.g., polyether group) can be secondary alcohols. In the case of certain bifunctional chain shuttling agents, both terminal groups of a polymer can be secondary alcohols. The terminal groups of the polymer can be further functionalized. For example, the terminal hydroxyl groups of the polyol can be functionalized with a diisocyanate to yield polyurethanes.

An isotactic polyether group can comprise at least 2 stereoregular blocks. For example, an isotactic polyether group can comprise at least 2 stereoregular blocks having the following structure:

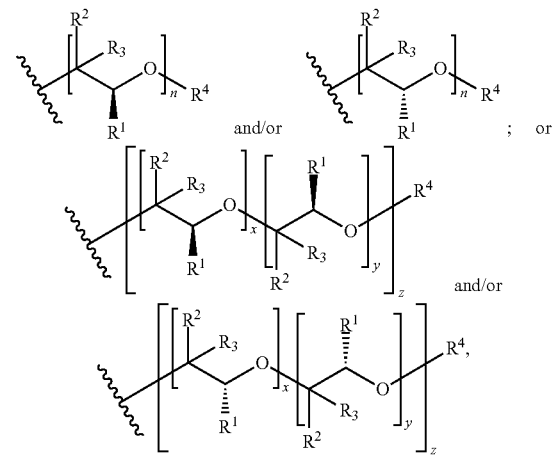

where $R^1$ is H or $C_1$ to $C_{20}$ aliphatic group, $R^4$ is H or $C_1$ to $C_{20}$ aliphatic group,

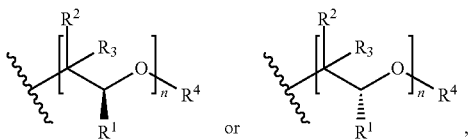

$R^2$ is H or a $C_1$ to $C_{20}$ aliphatic group, $R^3$ is H or a $C_1$ to $C_{20}$ aliphatic group, n is independently at each occurrence in the polyether group 5 to 500, x and y are independently at each occurrence in the polyether group 5 to 500, and z is greater than or equal to 1.

Polyether groups of the present disclosure are isotactic. For example, the mm-triad content of an isotactic polyether group or isotactic polyether groups (e.g., isotactic polyether group(s) of a polymer) is less than or equal to 94%. In various examples, the mm-triad content of the isotactic polyether group is less than or equal to 93%, 92%, 91%, 90%, 89%, 88%, 87%, 86%, 85%, or 80%. In another example, the mm-triad content of the isotactic polyether group is 94% to 25.1%, including all 0.1% values and ranges therebetween. In various examples, the mm-triad content of the isotactic polyether group is 93% to 25.1%, 92% to 25.1%, 91% to 25.1%, 90% to 25.1%, 89% to 25.1%, 88% to 25.1%, 87% to 25.1%, 86% to 25.1%, 85% to 25.1%, or 80% to 25.1%. For example, the mr-triad+rm-triad is greater than or equal to 2 times the rr-triad. In various examples, mr-triad+rm-triad is greater than or equal to 2 times, 2.1 times, 2.2 times, 2.3, times, 2.4, times, 2.5 times, 2.6 times, 2.7 times, 2.8 times, 2.9 times, or 3 times the rr-triad. In another example, the mr-triad+rm-triad is greater than or equal to 2 to 8 times the rr-triad, including all 0.1 values and ranges therebetween. In various examples, the mr-triad+rm-triad is greater than or equal to 2.1 to 8 times, 2.2 to 8 times, 2.3 to 8 times, 2.4 to 8 times, 2.5 to 8 times, 2.6 to 8 times, 2.7 to 8 times, 2.8 to 8 times, 2.9 to 8 times, 3 to 8 times, 4 to 8 times, 5 to 8 times, 6 to 8 times, or 7 to 8 times the rr-triad. In various examples, the polyether group has an aforementioned mm-triad content and the mr-triad+rm-triad is greater than or equal to an aforementioned value times the rr-triad or the mr-triad+rm-triad is an aforementioned range times the rr-triad. The isotacticity (e.g., mm-triad content, mr-triad, rm-triad, and/or rr-triad) of a polymer, polyether, or polyether group(s) can be determined by methods known in the art. For example, the isotacticity (e.g., mm-triad content, mr-triad, rm-triad, and/or rr-triad) of polymer, polyether, or polyether group(s) is determined by NMR spectroscopy (e.g., $^{13}C$ NMR spectroscopy).

Polymers can have a range of selectivity factors (s-factors). The s-factor describes the stereoselectivity of one enantiomer of the catalyst choosing the preferred enantiomer of the monomer.

Polymers can have a range of polydispersity (i.e., PDI values). For example, a polymer has a PDI of less than 2. In various examples, the PDI of a polymer is less than 1.8, is less than 1.6, or less than 1.5.

Polymers can have a range of $M_n$ values. For example, the $M_n$ of a polymer is in the range of 500 to 500,000 g/mol, including all values to the 10 g/mol and ranges therebetween. In various examples, the $M_n$ of a polymer is in the range of 500 to 500,000, 500 to 400,000, 500 to 250,000, 500 to 100,000, 500 to 40,000, 500 to 30,000, 750 to 15,000, or 1,000 to 5,000, 50,000 to 500,000, 50,000 to 250,000, 50,000 to 100,000 g/mol. The $M_n$ of a polymer can determined by methods known in the art (e.g., by NMR spectroscopy or GPC calibrated with polystyrene standards).

Polymers of the present disclosure can have desirable properties. For example, these polymers can be isotactic and semicrystalline or crystalline and have higher resistance to thermal deformation.

In an aspect, the present disclosure provides bimetallic complexes. A bimetallic complex (or mixture of bimetallic complexes) can be used as a catalyst (e.g., as a catalyst in method of making a polyether of the present disclosure). Bimetallic complexes (e.g., catalysts) can be made by methods described herein.

A metal complex has one of the following structures:

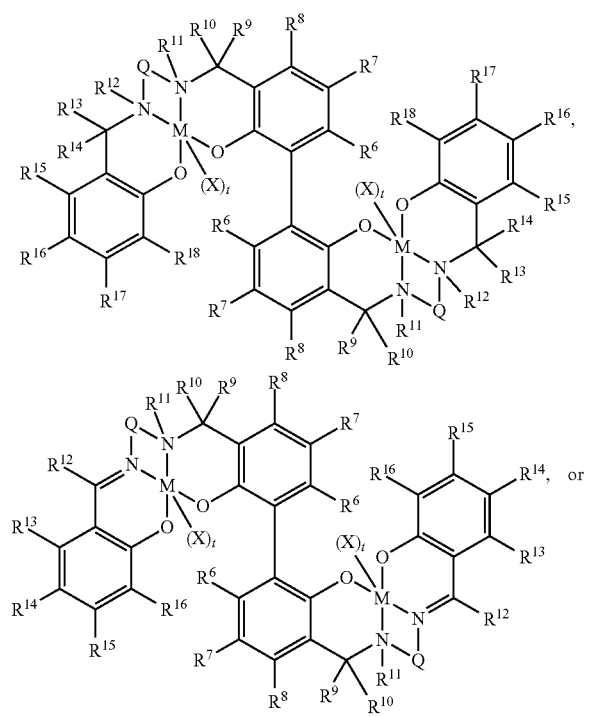

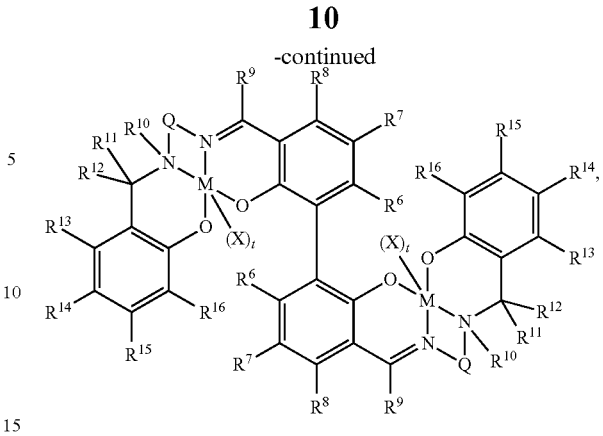

where M is a metal, X is a nucleophile or counterion, t is an integer from 0 to 2, Q is $C_1$ to $C_{20}$ aliphatic group, $C_5$ to $C_{20}$ aliphatic carbocyclic group, and each $R^6$ through $R^{18}$ independently are selected from the group consisting of hydrogen, $C_1$ to $C_{20}$ aliphatic group, halide, $C_1$ to $C_{20}$ alkoxide group, $C_6$ to $C_{20}$ aryl group. Optionally, adjacent $R^6$, $R^7$, $R^8$, $R^9$, $R^{10}$, $R^{11}$, $R^{12}$, $R^{13}$, $R^{14}$, $R^{15}$, $R^{16}$, $R^{17}$, or $R^{18}$ groups taken together with their intervening atoms to form a saturated, partially unsaturated, or aromatic 5 to 12 membered ring containing 0 to 4 heteroatoms, 5 to 6 membered carbocyclic group, aryl group, or 5 to 7-membered heteroaryl group, wherein the rings or groups are substituted. Q is $C_1$ to $C_{20}$ aliphatic group, including all integer numbers of carbons and ranges therebetween, or $C_5$ to $C_{20}$ aliphatic carbocyclic group, including all integer numbers of carbons and ranges therebetween.

In an example, Q is

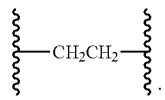

In an example, Q is

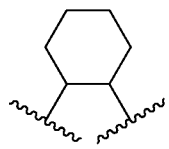 [SMILES: *C1CCCCC1*]

and the cylcohexane can be chiral or achiral. Each $R^9$ through $R^{17}$ independently are selected from the group consisting of hydrogen, $C_1$ to $C_{20}$ aliphatic group, including all integer numbers of carbons and ranges therebetween, halide (—F, —Cl, —Br, or —I), $C_1$ to $C_{20}$ alkoxide group, including all integer numbers of carbons and ranges therebetween, and $C_6$ to $C_{20}$ aryl group, including all integer numbers of carbons and ranges therebetween.

Certain groups on the catalyst ligand, taken together, can form ring structures. For example, two adjacent groups can form a ring structure. Accordingly, adjacent $R^9$, $R^{10}$, $R^{11}$, $R^{12}$, $R^{13}$, $R^{14}$, $R^{15}$, $R^{16}$, or $R^{17}$ groups can be taken together with their intervening atoms to form a saturated, partially unsaturated, or aromatic 5 to 12 membered ring (containing 0 to 4 heteroatoms), 5 to 6 membered carbocyclic group, aryl group, or 5 to 7-membered heteroaryl group. These rings or groups can, optionally, be substituted.

M is a metal of the periodic table. M can be a main group metal. M can be a transition metal. M can be a lanthanide metal. For example, M is a transition metal selected from the periodic table groups 3-12, inclusive, boron, or aluminum. In another example, M is a transition metal selected from the periodic table groups 5-10, inclusive. In still another example, M is a transition metal selected from the periodic table groups 7-9, inclusive. In various examples, M is selected from the group consisting of Cr, Mn, V, Fe, Co, Mo, W, Ru, Ti, Al, Zr, Hf, and Ni. In various examples, M is Cr, Al, or Co. For example, M is Cr.

X is a nucleophile or counterion. For example, X is Cl, Br, I, $N_3$, OAc, OPiv, OMe, OEt, OPr, OiPr, OBu.

For example, Q is

For example, X is Cl. For example, $R^{10}$, $R^{11}$, and/or $R^{12}$ is a $C_1$-$C_4$ alkyl group (e.g., a methyl group or an isopropyl group). In an example, Q is

X is Cl, and $R^{10}$, $R^{11}$, and/or $R^{12}$ is a $C_1$-$C_4$ alkyl group (e.g., a methyl group).

In various examples, the catalyst used in the method has one of the following structures:

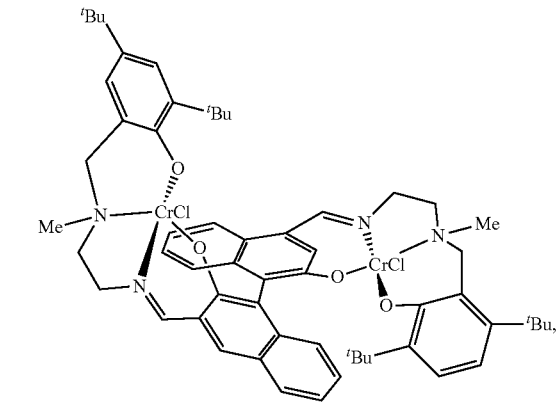

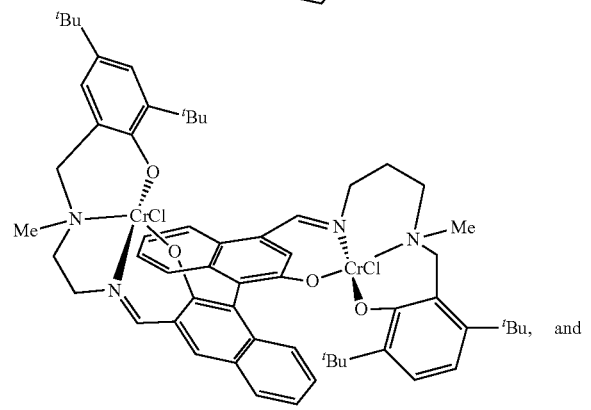

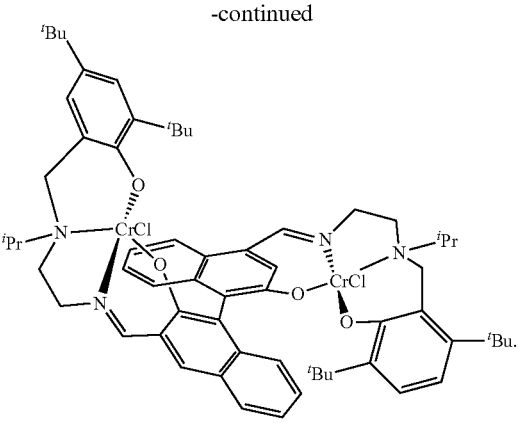

In an aspect, the present disclosure provide methods for making polyethers. The methods use a bimetallic complex of the present disclosure as a catalyst of the present disclosure and, optionally, one or more ionic co-catalyst and/or one or more monofunctional chain shuttling agents (e.g., monoalcohol chain shuttling agents) or multifunctional chain shuttling agents to provide polymers of the instant disclosure. For example, a polymer of the present disclosure is produced by a method disclosed herein.

For example, a method of making a polyether polymer comprises: polymerizing an epoxide in the presence of a catalyst and, optionally, one or more ionic co-catalyst and/or and one or more chain shuttling agent (CSA) (e.g., a monoalcohol chain shuttling agent or multifunctional chain shuttling agent). For example, a diols multifunctional chain shuttling agent is used with a catalyst to synthesize end-functionalized isotactic polyethers including telechelic diols from racemic epoxides. Telechelic diols and triols are important precursors of polyurethanes.

The method can proceed to varying degrees of conversion. In various examples, the method of forming a polymer is allowed to proceed to at least 30%, 35%, 40%, 45%, 50%, 55%, 60%, 65%, 70%, 75%, 80%, 85%, 90%, 95%, or 100% conversion before being quenched.

A polymerization can be a kinetic resolution method. For example, in addition to the steps of the methods described herein where a mixture of epoxide enantiomers is used, the kinetic resolution method further comprises the step of recovering unreacted epoxide, wherein the recovered epoxide is enantiomerically enriched. For example, the recovered the enantiomeric excess of recovered epoxide is greater than 50%. In various examples, the enantiomeric excess of recovered epoxide is greater than 75%, 80%, 85%, 90%, 95%, 97%, 98%, or 99%. The enantiomeric excess (% ee) can be measured by methods known in the art. For example, the enantiomeric excess is measured by $^1$H NMR spectroscopy.

Epoxides used in the method can be achiral (i.e., racemic or prochiral) or chiral. Epoxides of the method can have the following formula:

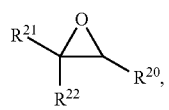

where, $R^{20}$ is a H or $C_1$ to $C_{20}$ aliphatic group, including all integer numbers of carbons and ranges therebetween, $R^{21}$ is H or a $C_1$ to $C_{20}$ aliphatic group, including all integer numbers of carbons and ranges therebetween, $R^{22}$ is H or a $C_1$ to $C_{20}$ aliphatic group, including all integer numbers of carbons and ranges therebetween. In an example, optionally, any two of $R^{21}$, $R^{22}$, and $R^{20}$ taken together can form with their intervening atoms can form one or more rings selected from the group consisting of: optionally substituted $C_3$ to $C_{14}$ carbocyclic group, optionally substituted $C_3$ to $C_{14}$ heterocyclic group, optionally substituted $C_6$ to $C_{10}$ aryl group, and optionally substituted $C_5$ to $C_{10}$ heteroaryl group. An epoxide can have the following structure:

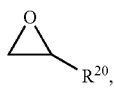

where $R^{20}$ is as defined herein. For example, $R^{20}$ is a methyl group, ethyl group, $CH_2OMe$, $CH_2OPh$, $CF_3$, or $CH_2Cl$. In an example, the epoxide is

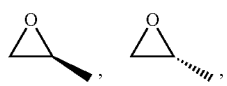

or a combination (e.g., a racemic mixture) thereof.

The epoxides can be prepared by known synthetic methods. Suitable epoxides are commercially available. Examples of suitable epoxides include propylene oxide, 1-butene oxide, 1-hexene oxide, 1-octene oxide, butadiene monoepoxide, epichlorhydrin, glycidyl ethers such as phenyl glycidyl ether, methyl glycidyl ether, ethyl glycidyl ether, n-butyl glycidyl ether, allyl glycidyl ether, and halogen substituted epoxides such as

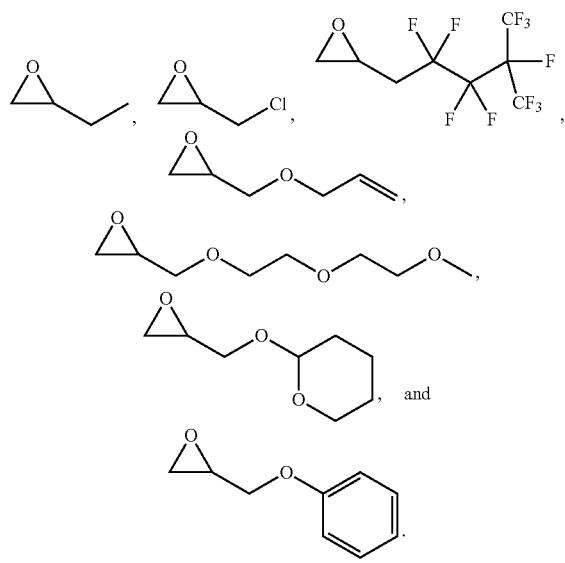

An epoxide can be present as mixtures of stereoisomers, where the mixture is, enriched in one stereoisomer relative the complementary stereoisomer (also referred to as an optically enriched form of the epoxide) or racemic mixtures of epoxide. In various examples, the epoxide can be present as a mixture of stereoisomers having greater than 90, 95, 99, 99.5, or 99.9% purity of one stereoisomer. In another example, optically pure (no detectible complementary stereoisomer present) epoxide is used. Optical purity can be determined by methods known in the art, for example, HPLC, GC, or nuclear magnetic resonance spectroscopy. Use of optically pure epoxide or optically enriched epoxide present as a mixture of epoxides, e.g., greater than 90% enrichment, in a stereoisomer in the methods described herein can result in formation of polymers having desirable properties.

In an example, an epoxide is present in large excess of all of the other components in the reaction mixture. For example, any of the above methods comprise a ratio of 500:1 to 500,000:1 of epoxide to catalyst and all ratios therebetween. For example, any of the above methods comprise a ratio of 500:1 to 100,000:1 of epoxide to catalyst. In various examples, any of the above methods comprise a ratio of 500:1 to 50,000:1 of epoxide to catalyst. In various examples, any of the above methods comprise a ratio of 500:1 to 5,000:1 of epoxide to catalyst. In various examples, any of the above methods comprise a ratio of 500:1 to 1,000:1 of epoxide to catalyst.

In various examples, any of the above methods comprise epoxide present in amounts between 0.5 M to 20 M and all values to the 0.1 M all and values therebetween. In various examples, epoxide is present in amounts between 0.5 M to 2 M. For example, epoxide is present in amounts between 2 M to 5 M. In various examples, epoxide is present in amounts between 5 M to 20 M. In various examples, epoxide is present in an amount of 20M. In various examples, liquid epoxide comprises the reaction solvent. In various examples, one or more additional epoxides are present at any of the aforementioned concentrations.

A catalyst is one or more of the bimetallic complexes of the present disclosure. The catalyst can be present as a racemic mixture of bimetallic complexes. The catalyst can be a chiral bimetallic catalyst (e.g., an enantiopure catalyst).

While not wishing to be bound by any particular theory, it is believed that the axial symmetry of provided bimetallic complexes is useful for providing enantioselective kinetic resolution of epoxides. For example, additional chiral groups may be utilized in provided bimetallic complexes to modulate the enantioselectivity of the kinetic resolution process.

For example, a polymerization is carried out with a 50:50 mixture of enantiomers of catalyst to form an optically inactive polyether. In other examples, the polymerization is carried out with an enantiomerically enriched catalyst to form optically active polyethers. In still another example, the polymerization is isoselective. For example, the catalyst is enantiomerically pure. For example, the polyether is optically pure. In another example, the polyether is enantioenriched.

In certain examples, when the bond between the biaryl linkage of provided catalyst is of S chirality, the provided products of the polymerization comprise polyethers with predominantly S chirality and epoxides with predominantly R chirality. In certain examples, when the bond between the biaryl linkage of provided bimetallic complexes is of R chirality, the provided products of the polymerization comprise polyethers with predominantly R chirality and epoxides with predominantly S chirality.

A catalyst can be present in a range of concentrations. For example, the methods comprise a catalyst present in an amount from 0.001 mole % to 1.0 mole % and all values to the 0.001 mole % and ranges therebetween. In various examples, the catalyst is present in an amount from 0.005 mole % to 0.5 mole %, or 0.01 mole % to 0.1 mole %. For example, the ratio of catalyst to ionic co-catalyst is 1:1, 1:5, 1:10, or 1:25 including all ratios therebetween.

While not wishing to be bound by any particular theory, it is believed that the axial symmetry of provided bimetallic complexes is useful for providing enantioselective polymerization. For example, additional chiral groups may be utilized in provided bimetallic complexes to modulate the enantioselectivity of the polymerization process.

The ionic co-catalyst is a salt. For example, the co-catalyst is an ammonium salt, a phosphonium salt, an imidazolium salt, a phosphazenium salt, or an arsonium salt. For example, the co-catalyst is an ammonium salt. Examples of ammonium salts include, but are not limited to: $(n\text{-Bu})_4NCl$, $(n\text{-Bu})_4NI$, $(n\text{-Bu})_4NBr$, $(n\text{-Bu})_4NN_3$, [PPN]Cl, [PPN]Br, and $[PPN]N_3$, $[Ph_3PCPh_3]Cl$, $[PPN]O(C=O)R^x$ where $R^x$ is a $C_1$ to $C_{20}$ aliphatic or aryl group. (PPN=Bis(triphenylphosphoranylidene) ammonium)). For example, a co-catalyst is the ammonium salt bis(triphenylphosphoranylidene)ammonium chloride ([PPN]Cl). For example, a co-catalyst is PPNOAc. For example, the co-catalyst is a tributylammonium salt.

For example, the co-catalyst is PPNOPiv (i.e.,

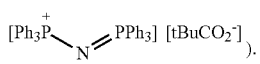

).

The CSA forms a CSG in the polymer. A CSA has one or more functional groups (e.g., hydroxy or thiol group(s) and/or carboxylic acid/carboxylate group(s)) that can facilitate formation of a polyether chain. The CSA can be a monoalcohol CSA or multifunctional CSA. A monoalcohol CSA forms a monoalcohol CSG in the polymer. A multifunctional CSA forms a multifunctional CSG in the polymer.

A monoalcohol CSA contains a single hydroxy group. In various examples, the monoalcohol CSA is methanol, ethanol, i-propanol, benzyl alcohol, p-methoxybenzyl alcohol, or a combination thereof.

The CSA can have a chiral center. For example, a monoalcohol CSA has the following structure:

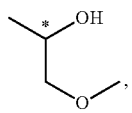

wherein * denotes a chiral carbon center.

A multifunctional CSA can contain a plurality of carboxylic acid/carboxylate groups, a plurality of hydroxy groups, or a combination of one or more carboxylic acid/carboxylate groups and one or more hydroxy groups. For example, the CSA is a multifunctional CSA and is $R^{19}\text{---}(COOH/OH)_z$, wherein $R^{19}$ is $C_1$ to $C_{20}$ aliphatic group, or $C_1$ to $C_{20}$ carbocyclic group, and z is from 1 to 10.

The CSA can be a bifunctional CSA. For example, the CSA is a diol, a dithiol, a diacid, or a hydroxy acid. For example, the CSA is a diol with $C_1$ to $C_{20}$ optionally substituted branched or linear aliphatic group, or a $C_3$ to $C_{20}$ optionally substituted carbocyclic group. In an example, the diol has the following structure:

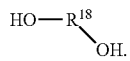

In an example, the hydroxyacid has the following structure:

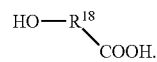

In another example, the diacid has the following structure:

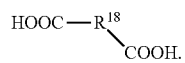

In yet another example, the diol has the following structure:

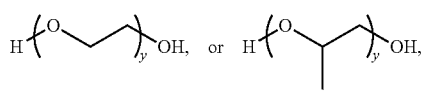

where y can be from 1 to 100. In various examples, the diol has one the following structures:

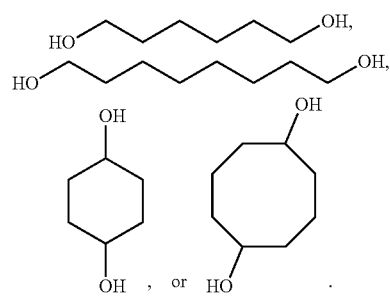

In various examples, multifunctional CSAs include sugars, polysaccharides, glycerols, and hydroxyl or carboxyl functional polymers (polyacrylates or polyvinylalcohols).

In an example, the epoxide are present in large excess of all of the other components in the reaction mixture. For example, any of the above methods comprise a ratio of 10:1 to 10,000:1 and all ranges of values of ratios therebetween of epoxide to CSA. In another example, any of the above methods comprise a ratio of 10:1 to 50:1 of epoxide to CSA. In still another example, any of the above methods comprise a ratio of 10:1 to 50:1 of epoxide to CSA.

The epoxide, catalyst, ionic co-catalyst, and CSA can be contacted in a solvent. For example, the reaction step of the methods further comprises one or more solvents. The solvent can be an organic solvent. For example, the solvent is a hydrocarbon solvent such as an aromatic hydrocarbon solvent (e.g., toluene) or an aliphatic hydrocarbon. In another example, the solvent is a halogenated hydrocarbon. In another example, the solvent is an ether, such as tetrahydrofuran or dimethoxyethane. The reaction can be run neat (i.e., without addition of a solvent). For example, the reaction step of any of the methods does not comprise a solvent.

A polymerization can be quenched at any point (e.g., at a desired conversion). Various quenching agents can be used. For example, quenching agents that are a source of protons are used. In another example, quenching agents (alkyl/silyl halides) can also be used to further functionalize the polymers.

Reaction times and conditions (e.g., reaction temperature) for a method (e.g., a polymerization reaction) can be varied to achieve the desired result. Selection of certain reaction times and conditions is within the purview of one having skill in the art. Generally, reaction times under 24 hours are used. For example, a polymerization reaction is conducted at a temperature of from −78° C. to 150° C. In various examples, a polymerization reaction is conducted at a temperature of from −10° C. to 30° C., 20° C. to 150° C., 20° C. to 120° C., 20° C. to 100° C., 30° C. to 150° C., 35° C. to 150° C., 50° C. to 150° C., 50° C. to 100° C., 20° C. to 80° C., or 20° C. to 50° C. A reaction can be conducted in a static atmosphere (e.g., a sealed reaction vessel) or as a stream (e.g., a flow-type reactor) under inert atmosphere. A reaction can be carried out at ambient conditions (e.g., 20° C.).

For example, a method uses 1,6-hexanediol as a chain shuttling agent to polymerize propylene oxide to give desired isotactic telechelic diols. These methods provide a route to isotactic telechelic diol with both diols being secondary, which allows for easier polyurethane formation.

Steps of the method disclosed herein are sufficient to produce polymers of the present disclosure. Thus, for example, the method consists essentially of a combination of steps of the methods disclosed herein. In another example, the method consists of such steps.

In an aspect, the present disclosure provides uses of polymers of the present disclosure. The polymers can be used in materials such as polyurethanes, elastomers, thermosets, and thermoplastics. The polymers can be used as non-ionic surfactants. The polymers can be used in biomedical devices.

For example, polyurethanes, elastomers, thermosets, or thermoplastics comprise one or more polymers of the present disclosure or one or more moieties derived from one or more polymers of the present disclosure. Polyurethanes, elastomers, thermosets, or thermoplastics comprising one or more polymers of the present disclosure or one or more moieties derived from one or more polymers of the present disclosure can be made using methods known in the art.

Figure 17:
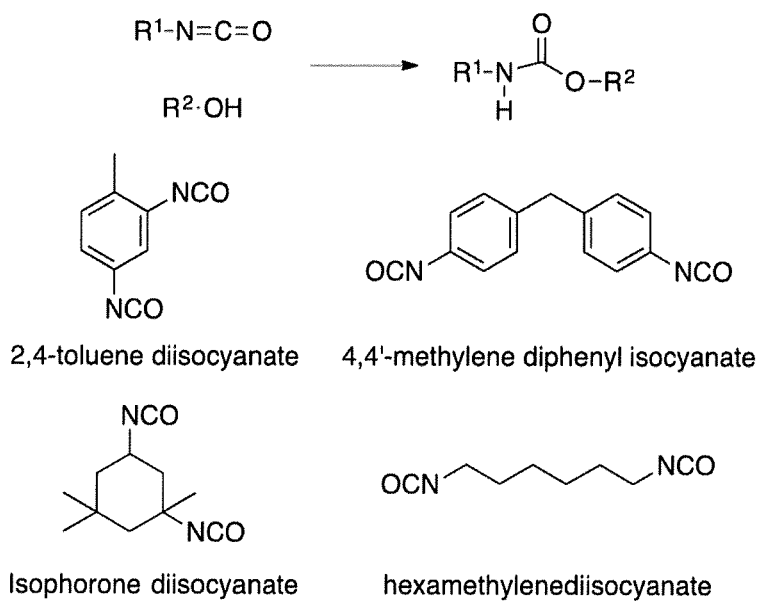
FIG. 17. Synthesis of polyurethanes with polyols of the present disclosure.

A polyurethane can comprise one or more polyether segments that structurally corresponds to a polymer of the present disclosure. Such polyether segments can be derived from a polymer of the present disclosure. A polyurethane can be made with a polyether (polyol) of the present disclosure. A polyurethane can have one or more polyether units. A polyurethane can be made from the reaction between a polyether that terminates with one or more secondary alcohols (polyol) of the present disclosure and a diisocyanate. A non-limiting representation of a polyurethane synthesis can be seen in FIG. 17.

The following examples are presented to illustrate the present disclosure. They are not intended to be limiting in any manner.

EXAMPLE 1

The following is an example of the preparation of bimetallic catalysts of the present disclosure and production of polymers of the present disclosure.

Figure 16:
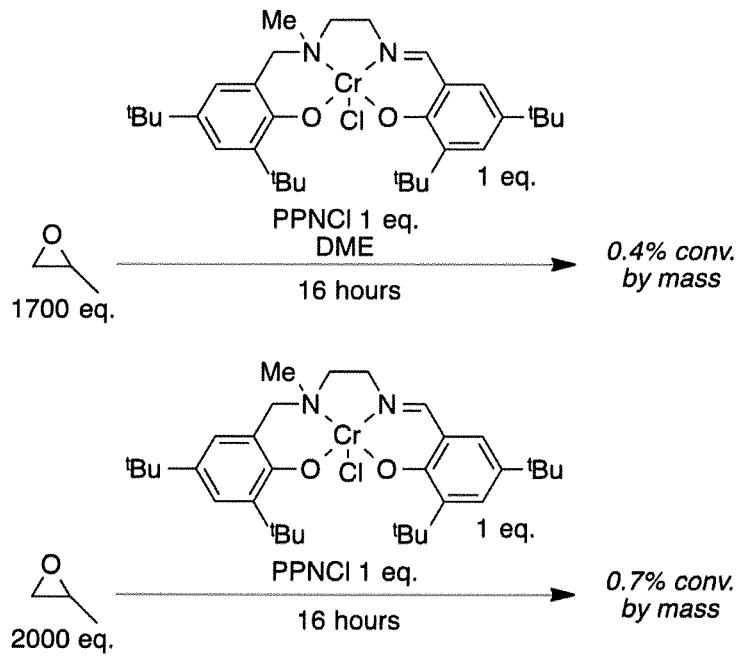
FIG. 16. Attempted polymerizations of PO by a monometallic (salalen)CrCl complex.

The precursor for the bimetallic N-Me-ethylenediamine (salalen)CrCl catalyst can be prepared in a one-pot synthesis for either the enantiopure or racemic form via the condensation of N-methylethylenediamine with 3,3'-diformyl-2,2'-dihydroxy-1,1'-bi-2-naphthol, followed by the $S_N2$ reaction of the product with 3,5-di-tert-butyl-2-hydroxybenzyl bromide and purification by recrystallization in methanol in 53% yield with no chromatography steps. Metallation of the ligand with $CrCl_2$ followed by air oxidation affords the bimetallic N-Me-ethylenediamine(salalen)CrCl catalyst in 94% yield. The bimetallic N-Me-ethylenediamine(salalen) CrCl catalyst (FIG. 1) was found to be active for the polymerization of rac-PO to iPPO when combined with commercially available PPNCl (Table 1, entry 1), giving stereoerrors of the type [mr]=[rm]=[rr], indicative of an enantiomorphic site control mechanism. Preliminary experiments with the bimetallic S-N-Me-ethylenediamine(salalen) CrCl catalyst showed that (S)—PO was preferentially consumed ($k_{rel} \approx 60$) and S-iPPO was produced. Attempts to polymerize propylene oxide using a monometallic (salalen) CrCl analogue of the bimetallic N-Me-ethylenediamine (salalen)CrCl catalyst yielded less than 1% polymer by mass (FIG. 16).

Figure 2:
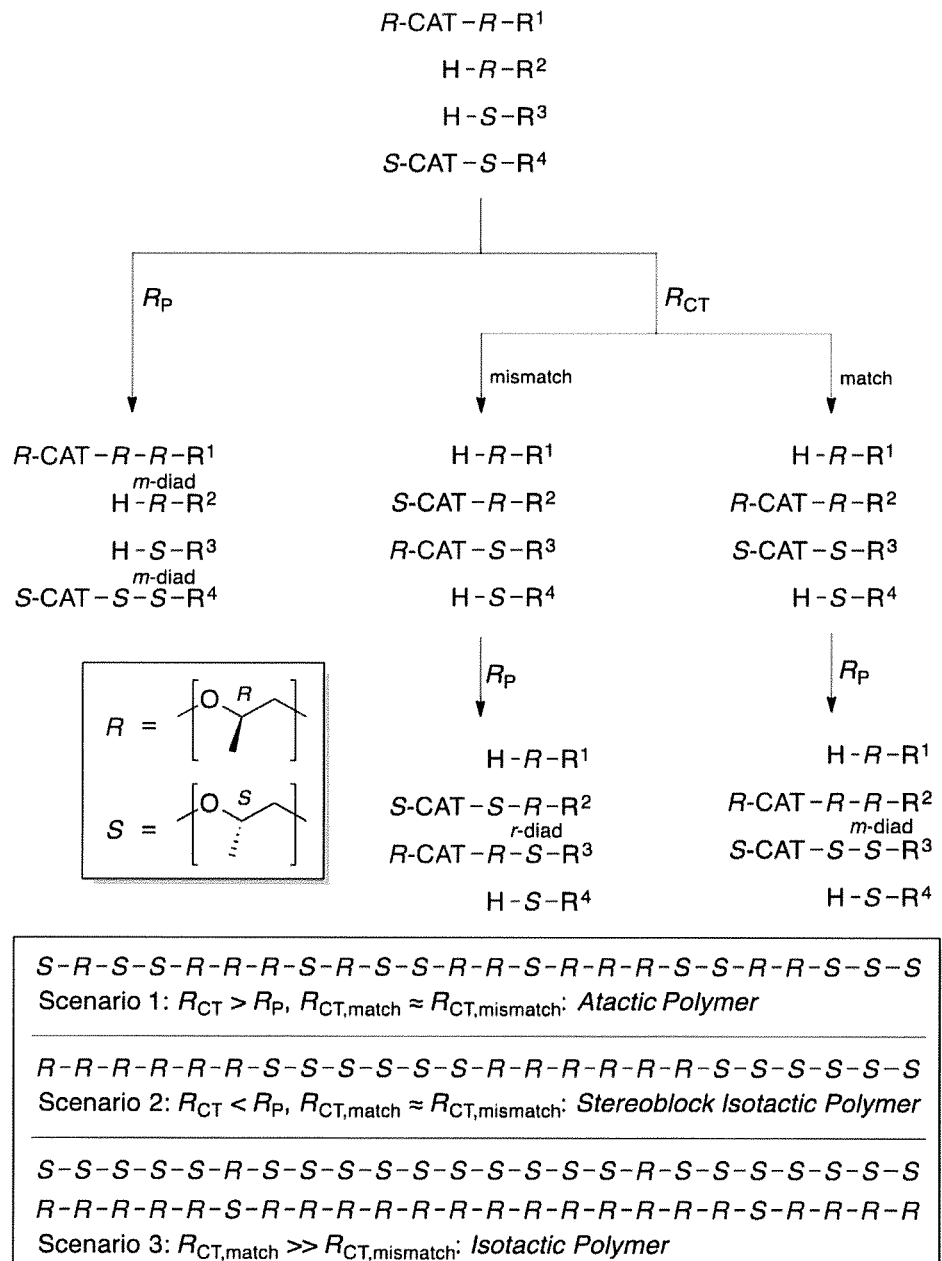
FIG. 2. Effect of chain transfer on polymer stereochemistry with racemic catalysts ($R_{CT}$=R Chain Transfer).

The stereochemical possibilities are significantly more complicated for the production of PPO with racemic catalysts in the presence of CSAs relative to the use of alcohols as CSAs for the production of multiple aPPO chains per achiral catalyst. As shown in FIG. 2, the tacticity of the resulting polymers is dependent upon the relative rates of "matched" and "mismatched" chain transfer ($R_{CT,match}$+ $R_{CT,mismatch}$=$R_{CT}$) and the rate of propagation ($R_P$), giving three limiting scenarios. In Scenario 1, $R_{CT}$>$R_P$ and $R_{CT,match} \approx R_{CT,mismatch}$, which leads to atactic polymer. In Scenario 2, $R_{CT}$<$R_P$ and $R_{CT,match} \approx R_{CT,mismatch}$, which leads to isotactic stereoblock polymer. In Scenario 3, $R_{CT,match}$>> $R_{CT,mismatch}$, which always leads to isotactic polymer. In order to produce telechelic isotactic PPO in the presence of CSAs, either Scenario 2 or Scenario 3 must dominate over Scenario 1. For Scenario 2 to occur, $R_{CT}$ must be rapid enough relative to $R_P$ to effectively modulate the molecular weight of the resulting polymer, but if $R_{CT}$ is too rapid Scenario 2 becomes Scenario 1 and atactic polymer is produced. Scenario 3 is ideal, as it results in highly isotactic polymers with narrow molecular weight distributions when $R_{CT}$>$R_P$, but it requires catalyst control over the stereochemistry of the chain transfer step and of the polymerization. Each of these scenarios gives rise to distinctive stereosequences that can be determined from the methine region of the $^{13}C$ NMR spectrum of the resulting PPO, which displays triad sensitivity. Scenario 1 will give polymers with stereotriads of the type [mm]=[mr]=[rm]=[rr]=0.25. Scenario 2 will give polymers with [mm]>>[rr], with stereoerrors of the type [mr]=[rm]>[rr]. Scenario 3 will also give polymers with [mm]>>[rr], but with site-control stereoerrors of the type [mr]=[rm]=[rr].

We next sought to produce iPPO diols using the racemic form of the bimetallic N-Me-ethylenediamine(salalen)CrCl catalyst with rac-PO and HD as a CSA. As can be seen in Table 1, entries 2-5, as the ratio of PO to HD decreased the molecular weight of the polymers produced also decreased, while the mm-content of the polymers remained above 87%. Integration of the terminal polymer methine proton ($\delta$=3.91 ppm) with the internal methylenes of the HD CSA ($\delta$=1.54 and 1.32 ppm) indicated that these groups were present in a 1:1 molar ratio, consistent with one polymer chain per CSA. Analysis of the methine region of the $^{13}C$ NMR spectra of these polymers revealed stereochemical errors of the type [mr]=[rm]>[rr](Table 1), consistent with the formation of stereoblocks of iPPO due to chain transfer being slower than propagation ($R_{CT}$<$R_P$, Scenario 2 in FIG. 2). Even at catalyst loadings of less than 0.01 mol % (entry 3 in Table 1) and 25× scale (entry 4 in Table 1), the polymerization achieved high conversions with the molecular weight of the polymers controlled by the ratio of PO to HD. All of the polyether diols were isolated as semicrystalline solids with melting points of 54-65° C., demonstrating that it is possible to produce semicrystalline iPPO diols from rac-PO and racemic catalysts under chain shuttling reaction conditions.

glycerol propoxylate (gPO) as a CSA led to trifunctional semicrystalline iPPO polyols that may be useful as crosslinkers in polyurethane synthesis. Atactic PPO diols of various molecular weights also worked well as CSAs (en-

TABLE 1

| entry | CSA | CSA $M_n$ (kDa) | PO/CSA | $T_{rxn}$ (° C.) | $t_{rxn}$ (h) | conv.[b] (%) | TON[c] | $M_n$[d] theo. (kDa) | $M_n$[e] NMR (kDa) | $M_n$[f] GPC (kDa) | $M_w/M_n$[f] | [mm][g] (%) | [mr]+[rm][g] (%) | [rr][g] (%) | $T_m$[h] (° C.) |
|---|---|---|---|---|---|---|---|---|---|---|---|---|---|---|---|
| 1 | none | n.a.[i] | n.a.[i] | 22 | 1.5 | 90 | 4,100 | 240 | n.a.[i] | 170 | 2.8 | 94.4 | 3.7 | 1.9 | 67 |
| 2 | HD | 0.1 | 100 | 22 | 2.3 | 99 | 3,700 | 5.5 | 5.5 | 7.6 | 1.7 | 90.0 | 8.0 | 2.0 | 63 |
| 3[j] | HD | 0.1 | 100 | 22 | 23 | 93 | 11,300 | 5.6 | 5.7 | 8.9 | 1.8 | 93.3 | 5.4 | 1.3 | 65 |
| 4[k] | HD | 0.1 | 100 | 22 | 21 | 99 | 11,500 | 5.8 | 6.0 | 8.9 | 1.7 | 89.7 | 8.6 | 1.7 | 62 |
| 5 | HD | 0.1 | 50 | 22 | 3.0 | 99 | 4,000 | 3.0 | 3.0 | 3.8 | 1.7 | 87.5 | 10.8 | 1.8 | 57 |
| 6 | gPO | 0.3 | 130 | 22 | 19 | 99 | 3,400 | 8.3 | 8.0 | 10.2 | 1.6 | 87.8 | 10.2 | 2.1 | 62 |
| 7 | gPO | 0.3 | 90 | 22 | 22 | 100 | 3,400 | 5.2 | 5.0 | 6.6 | 1.5 | 84.7 | 12.3 | 3.0 | 59 |
| 8 | aPPO | 1.2 | 40 | 22 | 22 | 98 | 4,200 | 3.2 | 3.1 | 4.8 | 1.8 | 65.4 | 24.6 | 10.1 | 59 |
| 9 | aPPO | 2.0 | 40 | 22 | 18 | 97 | 3,200 | 4.0 | 3.9 | 6.0 | 1.5 | 58.4 | 29.0 | 12.6 | 59 |
| 10 | aPPO | 3.0 | 80 | 22 | 17 | 94 | 3,600 | 7.5 | 7.4 | 10.9 | 1.7 | 66.4 | 23.3 | 10.3 | 64 |
| 11 | aPPO | 3.0 | 40 | 22 | 17 | 99 | 3,800 | 5.5 | 5.6 | 7.9 | 1.4 | 52.7 | 33.7 | 13.6 | 58 |
| 12 | PCL | 2.0 | 160 | 22 | 18 | 98 | 4,100 | 9.0[l] | 9.4[l] | 17.3 | 1.7 | 92.4 | 5.5 | 2.1 | 66 |
| 13 | PCL | 2.0 | 80 | 22 | 18 | 98 | 3,600 | 4.5[l] | 4.4[l] | 10.7 | 1.5 | 89.8 | 7.9 | 2.3 | 62 |
| 14 | none | n.a.[i] | n.a.[i] | 120 | 1.0 | 79 | 3,400 | 195 | n.a.[i] | 55 | 2.7 | 87.7 | 8.1 | 4.2 | 66 |
| 15 | HD | 0.1 | 30 | 120 | 24 | 96 | 3,600 | 1.7 | 1.8 | 2.2 | 1.2 | 61.4 | 31.5 | 7.1 | —[m] |
| 16 | gPO | 0.3 | 30 | 120 | 26 | 99 | 3,900 | 2.1 | 1.9 | 2.1 | 1.2 | 40.7 | 43.1 | 16.3 | —[m] |

[a]Polymerization conditions: 1 mL PO; [PO] = 4.8 M in DME; [PO]:[bimetallic N-Me-ethylenediamine(salalen)CrCl catalyst]:[cocatalyst] = 4,000:1:2.
[b]Determined gravimetrically.
[c]mmol PO consumed/mmol bimetallic N-Me-ethylenediamine(salalen)CrCl catalyst.
[d]Calculated using one polymer chain per bimetallic N-Me-ethylenediamine(salalen)CrCl catalyst and CSA (Supplementary Eq. 1).
[e]Determined by $^1$H NMR spectroscopy (Supplementary Eq. 2).
[f]Determined by GPC calibrated with polystyrene standards at 30° C. in THF.
[g]Determined by $^{13}$C NMR spectroscopy.
[h]Determined by DSC.
[i]n.a. = not applicable.
[j][PO]:[bimetallic N-Me-ethylenediamine(salalen)CrCl catalyst]:[cocatalyst] = 12,000:1:2.
[k]25 mL PO, [PO]:[bimetallic N-Me-ethylenediamine(salalen)CrCl catalyst]:[cocatalyst] = 12,000:1:2.
[l]For PPO segments only.
[m]A $T_m$ was not detected for this sample.
GPC chromatograms can be found in FIGS. 9-15.

Having produced iPPO diols using a small molecule CSA, we next explored the use of oligomeric and polymeric CSAs. As can be seen in Table 1, entries 6-7, the use of trifunctional tries 8-11), leading to iPPO-aPPO-iPPO stereoblock polymers with tunable levels of isotacticity and semicrystallinity. The polymerization was also shown to be stable to the addition of ester functionality, as poly(caprolactone) (PCL) diols lead to iPPO-PCL-iPPO block copolymers with no transesterification observed by $^1$H and $^{13}$C NMR spectroscopy (entries 12-13).

Next we examined the effect of increased reaction temperature on the relative rates of chain transfer and propagation as shown in Table 1. At 120° C. in the absence of CSAs, the bimetallic N-Me-ethylenediamine(salalen)CrCl catalyst produces isotactic PPO with only a small decrease in the mm-content and $T_m$ relative to the polymerization at 22° C. (entry 1). However, upon addition of CSAs (either HD or gPO, entries 2-3), the level of isotacticity drops dramatically and the resulting polyether is completely amorphous. We propose that as the temperature of the polymerization increases the bimolecular to bimolecular chain transfer process is favored relative to the bimolecular to unimolecular propagation process, resulting in a change from Scenario 2 to Scenario 1 as outlined in FIG. 2.

Figure 3:
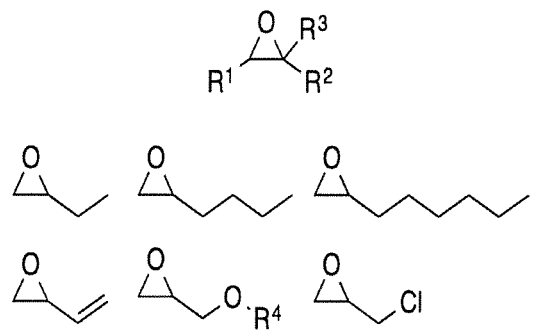
FIG. 3. Examples of epoxides for polymerization.

Related Epoxides/Catalysts/Cocatalysts/CSAs. Related epoxides (racemic or enantiopure) that may be polymerized via the methods reported within this paper are depicted in FIG. 3. They include but are not limited to 1-butene oxide, 1-hexene oxide, 1-octene oxide, butadiene monoepoxide, phenyl glycidyl ether, methyl glycidyl ether, ethyl glycidyl ether, n-butyl glycidyl ether, allyl glycidyl ether, and epichlorhydrin.

Figure 4:
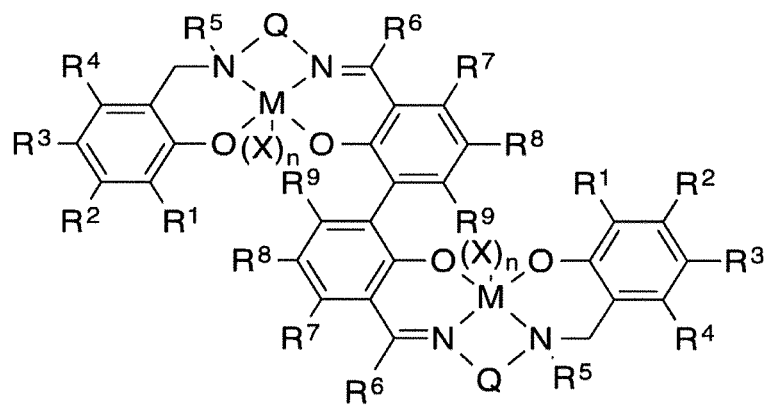
FIG. 4. Examples of catalysts for epoxide polymerization.
Figure 4:
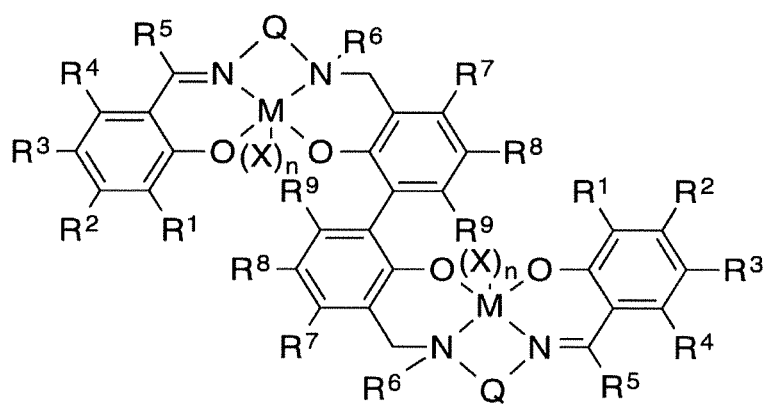

Related catalysts (racemic or enantiopure) to the bimetallic N-Me-ethylenediamine(salalen)CrCl catalyst may also be used to polymerize epoxides via the methods reported in this paper, some of which are depicted in FIG. 4.

Figure 5:
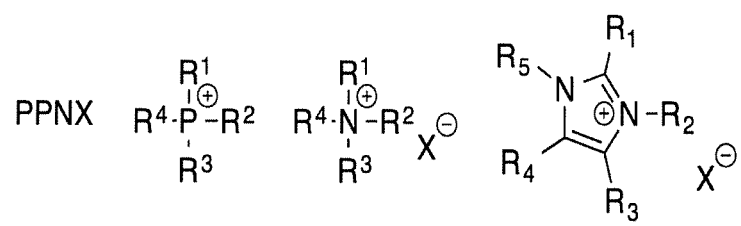
FIG. 5. Examples of ionic co-catalysts for epoxide polymerization.

Related ionic cocatalysts that may be used to polymerize epoxides in conjunction with the catalysts reported in this paper include PPN salts, phosphonium salts, phosphazenium salts, ammonium salts, and imidazolium salts, some of which are depicted in FIG. 5.

Figure 6:
FIG. 6. Examples of CSAs for epoxide polymerization.

A variety of chain shuttling agents may be used in conjunction with the methods reported in this paper. They include CSAs with primary, secondary, and tertiary alcohols (including polymers with hydroxyl end-groups), when the number of alcohols per CSA is from 1 to 12. They also include CSAs with carboxylic acids or hydroxyacids, with the number of carboxylic acids or hydroxyl and carboxylic acid groups is from 1 to 12. They also include CSAs with ammonia, primary amines, or secondary amines, when the number of amines per CSA is from 1 to 12. They also include CSAs with thiols, when the number of thiols per CSA is from 1 to 12. Some of these CSAs are depicted in FIG. 6. The resulting polymers grow off of one or more of the active hydrogen sites of the parent CSA. When racemic catalysts are used with chiral epoxides, the resulting isotactic polymers consist of one or more stereoblocks. The resulting polymers have predominantly secondary alcohols as end-groups.

In summary, we synthesized a racemic bimetallic (salalen)CrCl polymerization catalyst and used alkyl diol, PO-oligomer triols, and aPPO and PCL diols as CSAs in order to produce α,ω-hydroxy telechelic iPPO. The telechelic polymers have controlled molecular weights and are semi-crystalline. Amorphous αω-hydroxy telechelic PPO can also be produced by increasing the reaction temperature in conjunction with the use of CSAs.

Figure 7:
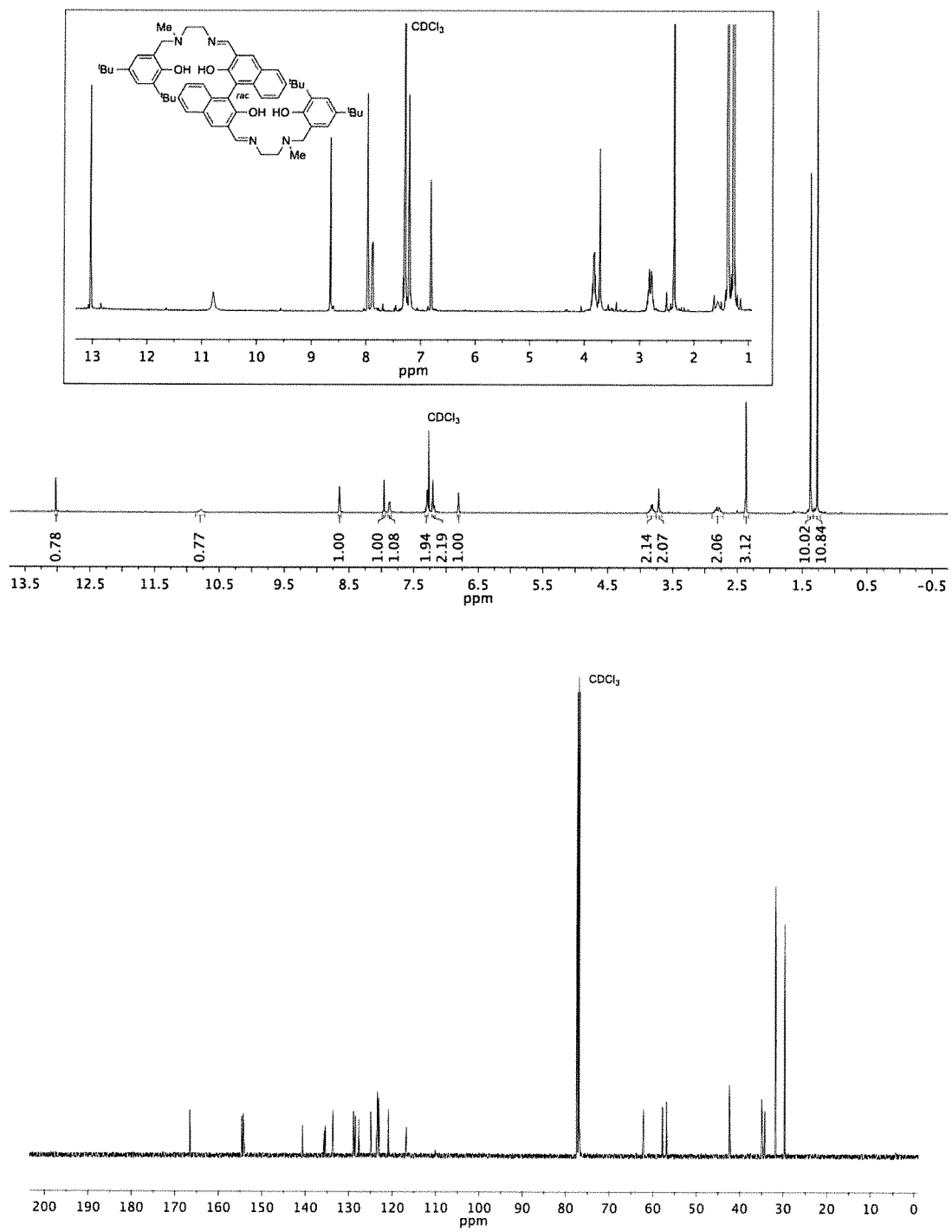
FIG. 7. $^1$H NMR (top) and $^{13}$C NMR (bottom) spectra of bimetallic N-Me-ethylenediamine(salalen)CrCl catalyst precursor.

Methods. General Considerations. All manipulations of air- or water-sensitive compounds were carried out under dry nitrogen using a Braun Labmaster glovebox or standard Schlenk line techniques. NMR spectra were recorded on a Varian INOVA 500 (1H, 500 MHz) spectrometer. $^1$H NMR spectra were referenced with residual solvent shifts (CHCl$_3$=7.26 ppm). $^{13}$C NMR spectra were referenced by solvent shifts (CDCl$_3$=77.23 ppm). Mass spectrometry was performed at Cornell University and the University of Illinois. Elemental analysis was performed at Midwest Microlab. $^1$H and $^{13}$C NMR spectra for the bimetallic N-Me-ethylenediamine(salalen)CrCl catalyst precursor (FIG. 7), the mass spectrum for the bimetallic N-Me-ethylenediamine(salalen)CrCl catalyst, and detailed polymer synthesis and characterization methods and data are included in the Supplementary Information.

Materials. HPLC grade methylene chloride (DCM), hexanes, tetrahydrofuran (THF), and methanol (MeOH) were purified over solvent columns, and degassed by sparging with nitrogen for 2 h (hours). Dimethoxyethane (DME) was dried over Na/benzophenone, then vacuum transferred and degassed through several freeze-pump-thaw cycles. Propylene oxide was dried over calcium hydride, degassed through several freeze-pump-thaw cycles, and then vacuum transferred and stored under nitrogen in a glovebox. (Salen)Co(III) catalysts and PPNOPiv were synthesized as previously reported. PPNCl was recrystallized from methylene chloride/hexanes, then dried at 80° C. under vacuum overnight. Three Angstrom sieves were activated by heating at 165° C. under vacuum for 20 h, and stored in a nitrogen filled glovebox. Triethylamine (NEt$_3$) and bimetallic N-methylethylenediamine were used as received. Starting materials 3,5-di-tert-butyl-2-hydroxybenzyl bromide and rac-3,3'-diformyl-2,2'-dihydroxy-1,1'-bi-2-naphthol were synthesized as previously described. CrCl$_2$ was stored in a nitrogen filled glovebox. 1,6-Hexanediol was dried overnight under vacuum at 40° C. Glycerol propoxylate (Mn=266 Da) and PPO diols (Mn=1,200 Da, 2,000 Da, and 3,000 Da) were added to a dry Schlenk tube under N$_2$, dry toluene added via canula, and then dried under vacuum at 70° C. overnight. Poly(caprolactone) diol (Mn=2,000 Da) was dried overnight under vacuum at 60° C. All polymer diols were then stored as 50% (w/w) solutions in dry DME over 3 Angstrom molecular sieves in a nitrogen filled glovebox. All other reagents were purchased from commercial sources and used as received.

Synthesis of the bimetallic N-Me-ethylenediamine(salalen)CrCl catalyst precursor.

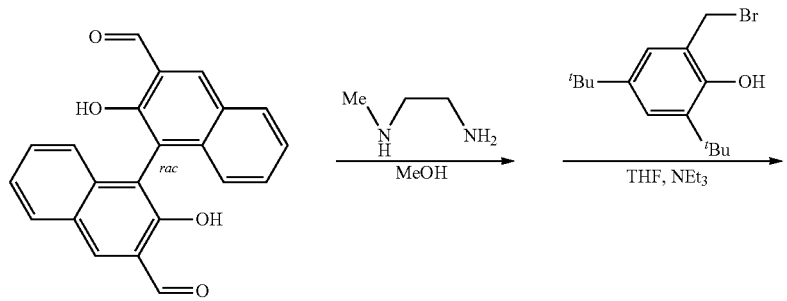

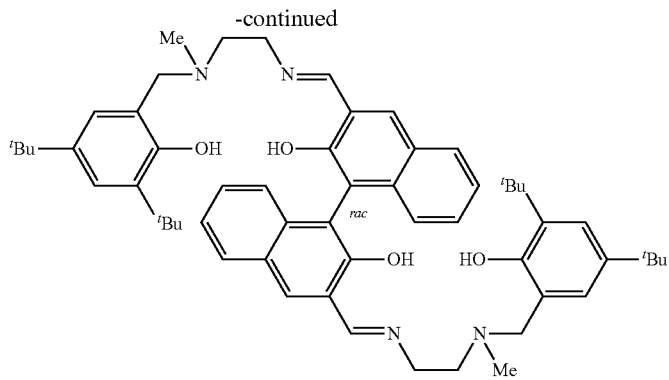

The ligand and complex were synthesized in a similar manner to previously reported monometallic salalen compounds. In a Schlenk tube, rac-3,3'-diformyl-2,2'-dihydroxy-1,1'-bi-2-naphthol (1.0 g, 2.9 mmol) and MeOH (40 mL) were combined under nitrogen. N Methylethylenediamine was added via syringe, and the yellow slurry became a homogeneous red solution over the course of 1 hours, then volatiles were evacuated under vacuum at 40° C. to yield a yellow powder to which THF (12 mL) and NEt$_3$ (1.0 ml, 6.4 mmol) were added under nitrogen. In a separate Schlenk tube, 1.75 g (5.85 mmol) 3,5-di-tert-butyl-2-hydroxybenzyl bromide was combined with THF (12 mL) under nitrogen, then added via canula to the reaction product of rac-3,3'-diformyl-2,2'-dihydroxy-1,1'-bi-2-naphthol and N-methylethylenediamine. A fine precipitate formed, and the reaction was stirred overnight and then filtered through a pad of celite. The solvent was removed via rotary evaporation and the resulting solid redissolved in DCM, washed with H$_2$O and then aqueous NaCl solution, dried over MgSO$_4$, and filtered. The solvent was then removed, and the solid was recrystallized from dry MeOH (~150 mL) to yield 1.4 g of small yellow crystals (53% yield). Anal. Calcd. (found) for C$_{58}$H$_{74}$N$_4$O$_4$ (bimetallic N-Me-ethylenediamine(salalen)CrCl catalyst precursor): C, 78.16 (78.35); H, 8.37 (8.40); N, 6.29 (6.39). $^1$H NMR (CDCl$_3$, 500 MHz) δ (ppm) 13.01 (b, 1H), 10.74 (b, 1H), 8.64 (s, 1H), 7.95 (s, 1H), 7.87 (m, 1H), 7.27 (m, 2H), 7.19 (d, J=1.7 Hz, 1H), 7.18 (m, 1H), 6.80 (d, J=1.7 Hz, 1H), 3.81 (m, 2H), 3.70 (s, 2H), 2.78 (m, 2H), 2.35 (s, 3H), 1.36 (s, 9H), 1.26 (s, 9H). $^{13}$C NMR (CDCl$_3$, 125 MHz) δ (ppm) 166.54, 154.72, 154.27, 140.70, 135.69, 135.49, 133.63, 129.01, 128.55, 127.71, 124.89, 123.46, 123.41, 123.16, 120.98, 120.97, 116.77, 62.22, 57.82, 56.92, 42.39, 34.97, 34.27, 31.82, 29.71. HRMS-ESI (m/z): calculated for C$_{58}$H$_{75}$N$_4$O$_4$$^+$ (bimetallic N-Me-ethylenediamine(salalen)CrCl catalyst precursor), 891.5781; found, 891.5783.

Synthesis of the Bimetallic N-Me-ethylenediamine(salalen)CrCl Catalyst.

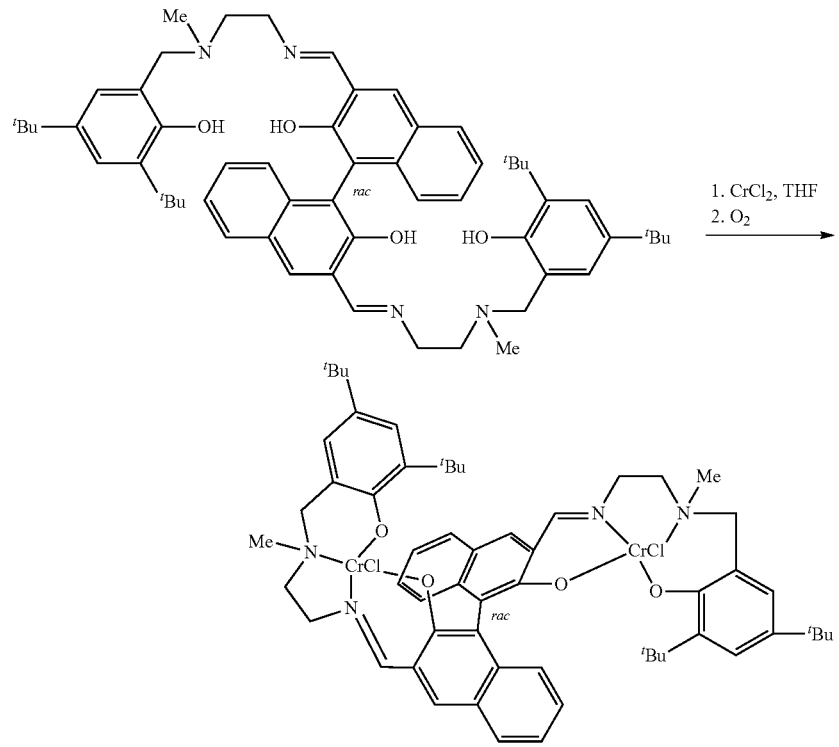

The bimetallic N-Me-ethylenediamine(salalen)CrCl catalyst precursor (0.50 g, 0.56 mmol) was added to a Schlenk tube under nitrogen and then dry and degassed THF (20 mL) was added via canula. In a nitrogen filled glovebox, $CrCl_2$ (0.15 g, 1.2 mmol) was added to a separate Schlenk tube which was sealed, then removed from the box and dry and degassed THF (20 mL) was added via canula. The mixture of the bimetallic N-Me-ethylenediamine(salalen)CrCl catalyst precursor in THF was then added via canula to the suspension of $CrCl_2$ in THF and the reaction was then stirred at 40° C. for three hours, then opened to dry air and stirred overnight. The reaction mixture was diluted to twice its original volume with $Et_2O$, washed three times with aqueous $NH_4Cl$ solution, and three times with aqueous NaCl solution. The organic layer was then dried over $MgSO_4$, filtered, dried under vacuum, then sonicated in pentanes and filtered over a fine glass frit to yield 0.56 g of the bimetallic N-Me-ethylenediamine(salalen)CrCl catalyst as a red-black solid, 94% yield. Anal. Calcd. (found) for $C_{58}H_{74}Cl_2Cr_2N_4O_6$ (bimetallic N-Me-ethylenediamine (salalen)CrCl catalyst·$2H_2O$): C, 63.44 (63.11); H, 6.79 (6.46); N, 5.10 (4.81). Previous (salalen)CrCl complexes have also been isolated with one molecule of $H_2O$ per Cr center.36, 37 NMR samples were paramagnetic. All attempts at crystallizing this complex in a variety of solvents have failed to date, possibly due to the presence of endo-endo, endo-exo, and exo-exo isomers, as well as stereoisomers due to the two stereogenic nitrogen atoms. HRMS-ESI (m/z): calculated for $C_{58}H_{70}N_4O_4^{2+}$ (bimetallic N-Me-ethylenediamine(salalen)CrCl catalyst--$2Cl^-$), 495.2098; found, 495.2097, calculated for $C_{59}H_{74}N_4O_5^{2-}$ (bimetallic N-Me-ethylenediamine(salalen)CrCl catalyst-·MeOH-$2Cl^-$), 511.2229; found, 511.2227, calculated for $C_{60}H_{78}N_4O_6^{2+}$ (bimetallic N-Me-ethylenediamine(salalen)CrCl catalyst-·$2MeOH-2Cl^-$), 527.2360; found, 527.2361.

Polymerization of other epoxides with the bimetallic N-Me-ethylenediamine(salalen)CrCl catalyst. 0.31 mL of 1-butene oxide (3.57 mmol), 3.8 mg the bimetallic N-Me-ethylenediamine(salalen)CrCl catalyst (0.00357 mmol), and 5.1 mg [PPN][Cl] (0.0089 mmol) were combined in a vial under $N_2$ and stirred at room temperature. The polymerization rapidly exothermed, and volatiles were removed under vacuum after four hours to yield 99.3% conversion of polymer.

1.9 mL of phenyl glycidyl ether (14.3 mmol), 4.4 mg the bimetallic N-Me-ethylenediamine(salalen)CrCl catalyst (0.0041 mmol), and 3.8 mg [PPN][Cl] (0.0066 mmol) were combined in a vial under $N_2$ and stirred at room temperature. The reaction mixture slowly solidified over several hours to a semi-crystalline polymer in 99.6% conversion.

1.9 mL of phenyl glycidyl ether (14.3 mmol), 4.4 mg of the bimetallic N-Me-ethylenediamine(salalen)CrCl catalyst (0.0041 mmol), and 3.8 mg [PPN][Cl] (0.0066 mmol) were combined in a vial under $N_2$ and stirred at room temperature. The reaction mixture slowly solidified over several hours to a semi-crystalline polymer in 99.6% conversion.

1-octanethiol CSA and the bimetallic N-Me-ethylenediamine(salalen)CrCl catalyst. 1.0 mL PO (14.3 mmol), 4.5 mg of the bimetallic N-Me-ethylenediamine(salalen)CrCl catalyst (0.0042 mmol), 4.3 mg [PPN][Cl] (0.0075 mmol), 2 mL DME, and 24.4 mg 1-octanethiol (0.167 mmol) were combined in a vial under $N_2$ and stirred at room temperature. After 15 hours, a solid mass of polymer was present and volatiles were removed under vacuum to yield 99.2% of polymer. The polymer had an [mm]=0.949, [mr]+[rm]=4.1, and [rr]=0.9, with a $T_m$ of 67° C., and an $M_{n\ theo}$=4942 Da and an $M_{n\ NMR}$=5086 Da.

Synthesis of the Bimetallic N-iPr-ethylenediamine(salalen)CrCl Precursor.

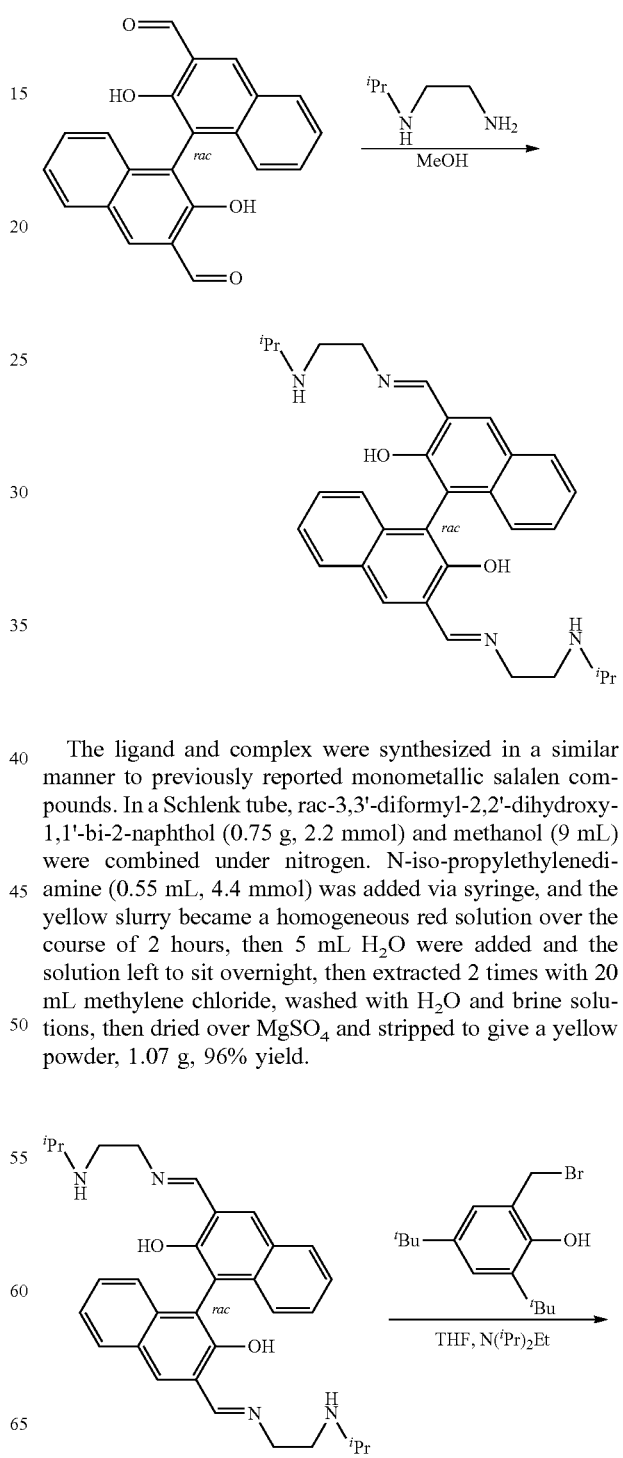

The ligand and complex were synthesized in a similar manner to previously reported monometallic salalen compounds. In a Schlenk tube, rac-3,3'-diformyl-2,2'-dihydroxy-1,1'-bi-2-naphthol (0.75 g, 2.2 mmol) and methanol (9 mL) were combined under nitrogen. N-iso-propylethylenediamine (0.55 mL, 4.4 mmol) was added via syringe, and the yellow slurry became a homogeneous red solution over the course of 2 hours, then 5 mL $H_2O$ were added and the solution left to sit overnight, then extracted 2 times with 20 mL methylene chloride, washed with $H_2O$ and brine solutions, then dried over $MgSO_4$ and stripped to give a yellow powder, 1.07 g, 96% yield.

-continued

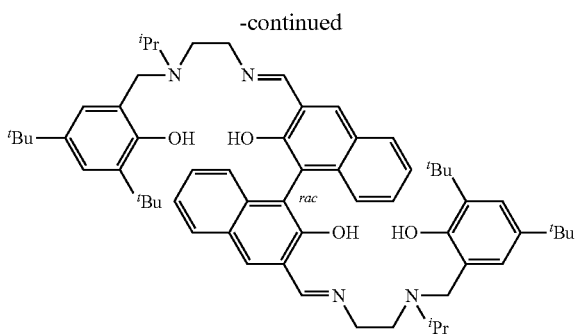

This product then added to a Schlenk tube (1.00 g, 1.95 mmol) followed by 6 mL tetrahydofuran and 0.85 mL N($^i$Pr)$_2$Et (4.9 mmol). In a separate Schlenk tube, 1.17 g (3.9 mmol) 3,5-di-tert-butyl-2-hydroxybenzyl bromide was combined with tetrahydrofuran (6 mL) under nitrogen, then added via cannula to the reaction product of rac-3,3'-diformyl-2,2'-dihydroxy-1,1'-bi-2-naphthol and N-iso-propyl-ethylenediamine. A fine precipitate formed, and the reaction was stirred for an hour and then filtered through a pad of celite. The solvent was removed via rotary evaporation and the resulting solid redissolved in methylene chloride, precipitated into 50 mL −78° C. methanol and then filtered over a fine glass frit to yield 0.86 g of a fine yellow powder (47% yield).

Synthesis of the Bimetallic N-iPr-ethylenediamine(salalen)CrCl Catalyst.

The bimetallic N-iPr-ethylenediamine(salalen)CrCl precursor (0.41 g, 0.43 mmol) was added to a Schlenk tube under nitrogen followed by dry and degassed tetrahydrofuran (10 mL) and then chromium (II) chloride (0.12 g, 0.96 mmol) was added to a separate Schlenk tube which was sealed, then removed from the box and dry and degassed tetrahydrofuran (10 mL) was added via cannula. The mixture of the bimetallic N-iPr-ethylenediamine(salalen)CrCl precursor in THF was then added via cannula to the suspension of chromium(II) chloride in THF and the reaction was then stirred at 40° C. for three hours, then opened to dry air and stirred overnight. The reaction mixture was diluted to twice its original volume with diethyl ether, washed three times with saturated aqueous ammonium chloride, and three times with saturated aqueous sodium chloride. The organic layer was then dried over MgSO$_4$, filtered, dried under vacuum, then sonicated in pentanes and filtered over a fine glass frit to yield 0.48 g of the bimetallic N-iPr-ethylenediamine(salalen)CrCl catalyst as a red-black solid, 99% yield.

Polymerization of PO with the bimetallic N-iPr-ethylenediamine(salalen)CrCl catalyst. 1.0 mL PO (14.3 mmol), 4.4 mg Catalyst-iPr (0.0039 mmol), 3.7 mg [PPN][Cl] (0.0064 mmol), and 2 mL DME were combined in a vial under N2 and stirred at room temperature for 17 hours and then volatiles were removed under vacuum to yield 95.6% conversion to semi-crystalline PPO with an [mm]=0.437, [mr]+[rm]=0.375, and [rr]=0.188, and a T$_m$=62° C.

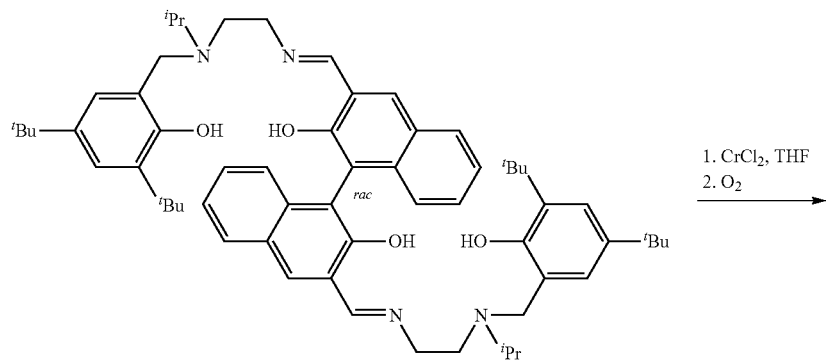

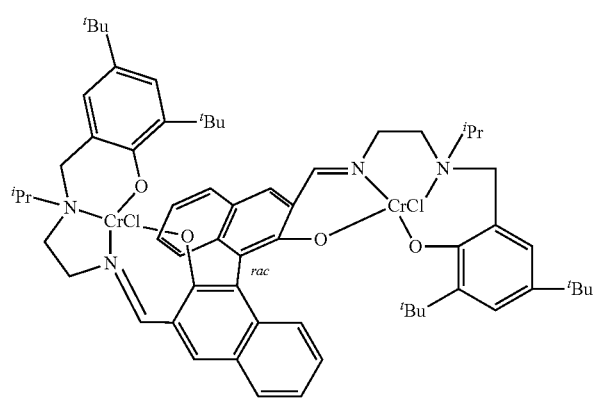

Synthesis of the Bimetallic N-Me-propylenediamine (salalen)CrCl Precursor.

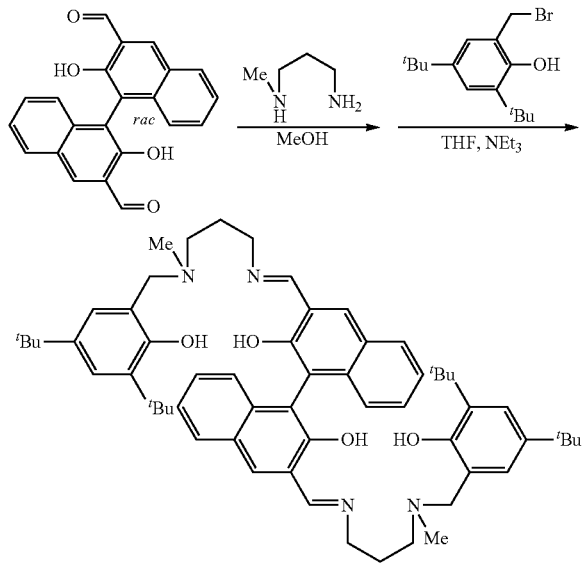

Synthesis of the Bimetallic N-Me-propylenediamine (salalen)CrCl Catalyst.

The ligand and complex were synthesized in a similar manner to previously reported monometallic salalen compounds. In a Schlenk tube, rac-3,3'-diformyl-2,2'-dihydroxy-1,1'-bi-2-naphthol (0.75 g, 2.2 mmol) and methanol (9 mL) were combined under nitrogen. N-Me-1,3-propanediamine (0.46 mL, 4.38 mmol) was added via syringe, and the yellow slurry became a homogeneous red solution over the course of 1.5 hour, then volatiles were evacuated under vacuum at 50° C. the 100° C. to yield a yellow powder to which tetrahydrofuran (6 mL) and triethylamine (0.70 ml, 4.8 mmol) were added under nitrogen. In a separate Schlenk tube, 1.31 g (4.38 mmol) 3,5-di-tert-butyl-2-hydroxybenzyl bromide was combined with tetrahydrofuran (6 mL) under nitrogen, then added via cannula to the reaction product of rac-3,3'-diformyl-2,2'-dihydroxy-1,1'-bi-2-naphthol and N-Me-1,3-propanediamine. A fine precipitate formed, and the reaction was stirred 2 hours and then filtered through a pad of celite. The solvent was removed via rotary evaporation and the resulting solid recrystallized from boiling methanol to yield yellow solids, 1.37 g (68% yield).

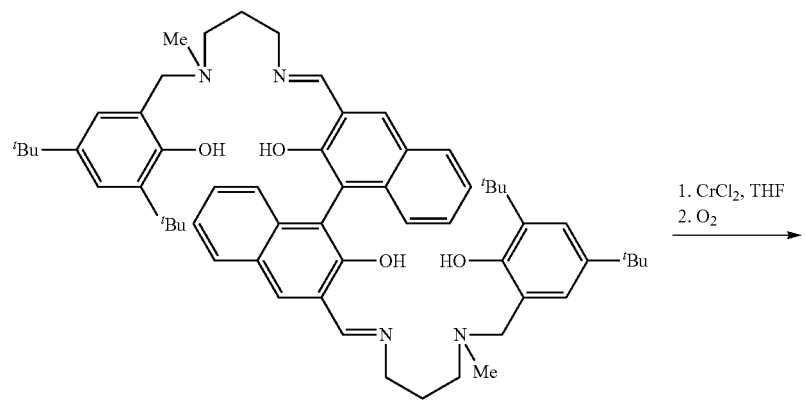

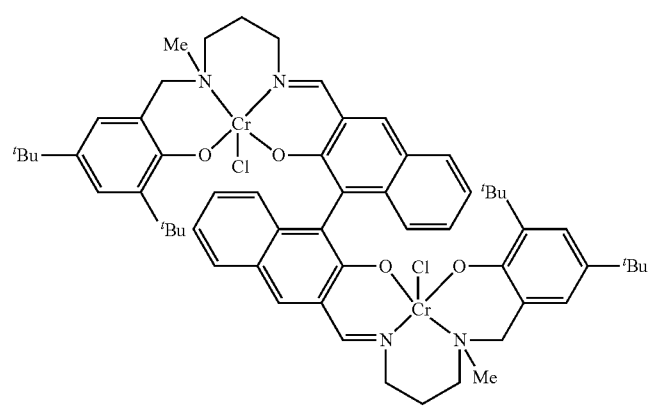

The bimetallic N-Me-propylenediamine(salalen)CrCl precursor (0.51 g, 0.56 mmol) was added to a Schlenk tube under nitrogen and then dry and degassed THF (20 mL) was added via cannula. In a nitrogen filled glovebox, chromium (II) chloride (0.15 g, 1.2 mmol) was added to a separate Schlenk tube which was sealed, then removed from the box and dry and degassed tetrahydrofuran (20 mL) was added via cannula. The mixture of the bimetallic N-Me-propylenediamine(salalen)CrCl precursor in THF was then added via cannula to the suspension of chromium(II) chloride in THF and the reaction was then stirred at 40° C. for three hours, then opened to dry air and stirred overnight. The reaction mixture was diluted to twice its original volume with diethyl ether, washed three times with saturated aqueous ammonium chloride, and three times with saturated aqueous sodium chloride. The organic layer was then dried over $MgSO_4$, filtered, dried under vacuum, then sonicated in pentanes and filtered over a fine glass frit to yield 0.53 g of the bimetallic N-Me-propylenediamine(salalen)CrCl catalyst as a red-black solid, 88% yield.

Polymerization of PO with the bimetallic N-Me-propylenediamine(salalen)CrCl catalyst. 1.0 mL PO (14.3 mmol), 4.3 mg of the bimetallic N-Me-propylenediamine(salalen)CrCl catalyst (0.0039 mmol), and 4.9 mg [PPN][Cl] (0.0085 mmol) were added to a vial under $N_2$ and stirred at room temperature. Within 5 minutes, the polymerization exothermed to yield 99.1% conversion to semi-crystalline PPO.

Attempted Polymerizations of Propylene Oxide with a Monometallic (salalen)CrCl Complex. General procedure: In a nitrogen filled glovebox, monometallic (salalen)CrCl complex (4.2 mg, 0.0071 mmol) (synthesized according to a previously reported procedure), [PPN][Cl] (4.1 mg, 0.0071 mmol), and 2 mL DME (if used) were added to a 20 mL scintillation vial. PO (1.00 mL, 830 mg, 14.3 mmol) was added via syringe, the vial was capped with a Teflon cap, removed from the glovebox, and stirred. When the reaction was complete, volatiles were removed under reduced pressure, and the mass of the polymer was determined.

General Polymerization Procedure. In a nitrogen filled glovebox, catalyst (0.0036 mmol), cocatalyst (0.0071 mmol), an appropriate amount of CSA solution, and solvent were added to a 20 mL scintillation vial. PO (1.00 mL, 830 mg, 14.3 mmol) was added via syringe, the vial was capped with a Teflon cap, removed from the glovebox, and stirred. When the reaction was complete, volatiles were removed under reduced pressure, and the mass of the polymer was determined.

Polymer Characterization Methods. The polyethers were characterized by gel permeation chromatography (GPC) using an Agilent PL-GPC 50 integrated system, equipped with UV and refractive index detectors, and 2 PL gel Mini-MIX C columns (5 micron, 4.6 mm ID). The GPC columns were eluted with tetrahydrofuran at 30° C. at 0.3 mL/min and were calibrated with monodisperse polystyrene standards.

Polymer melting points ($T_m$) were measured by differential scanning calorimetry (DSC) using a Mettler Polymer DSC. Polymer samples were heated under nitrogen from −70° C. to 200° C. at a rate of 10° C. per minute and then cooled to −70° C. at a rate of 10° C. per minute, followed heating to 200° C. at a rate of 10° C. per minute. The $T_m$ was recorded from the second heating run. Glass transition temperatures were not observed for PPO.

$M_n$ theoretical was calculated according to Eq. 1. $M_n$ NMR was calculated according to Eq. 2, where f is the functionality of the chain shuttling agent used (f=2 for 1,6-hexanediol and polymer diols, f=3 for glycerol propoxylate).

$$M_n \text{ theoretical} = \frac{\text{mg crude} - \text{mg } cat - \text{mg } cocat}{\text{mmol } cat + \text{mmol } CSA} \quad (1)$$

$$M_n \text{ NMR} = \quad (2)$$
$$f \times \frac{\Sigma \begin{pmatrix} \text{terminal methine, methine,} \\ \text{methylene, and methyl integrals} \end{pmatrix}}{6 \times \text{terminal methine integral}} \times 58.09 + MW \, CSA$$

Example for Table 1, entry 2
$$M_n \text{ NMR} = 2 \times \frac{2.12 + 300 + 289.16}{6 \times 2.12} \times 58.09 + 118.17$$
$$M_n \text{ NMR} = 5500$$

Figure 8:
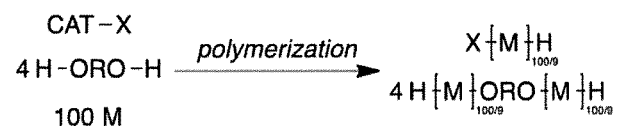
FIG. 8. Representation of an ideal polymerization with 1 catalyst, 4 difunctional chain shuttling agents, and 100 monomers.
Figure 9:
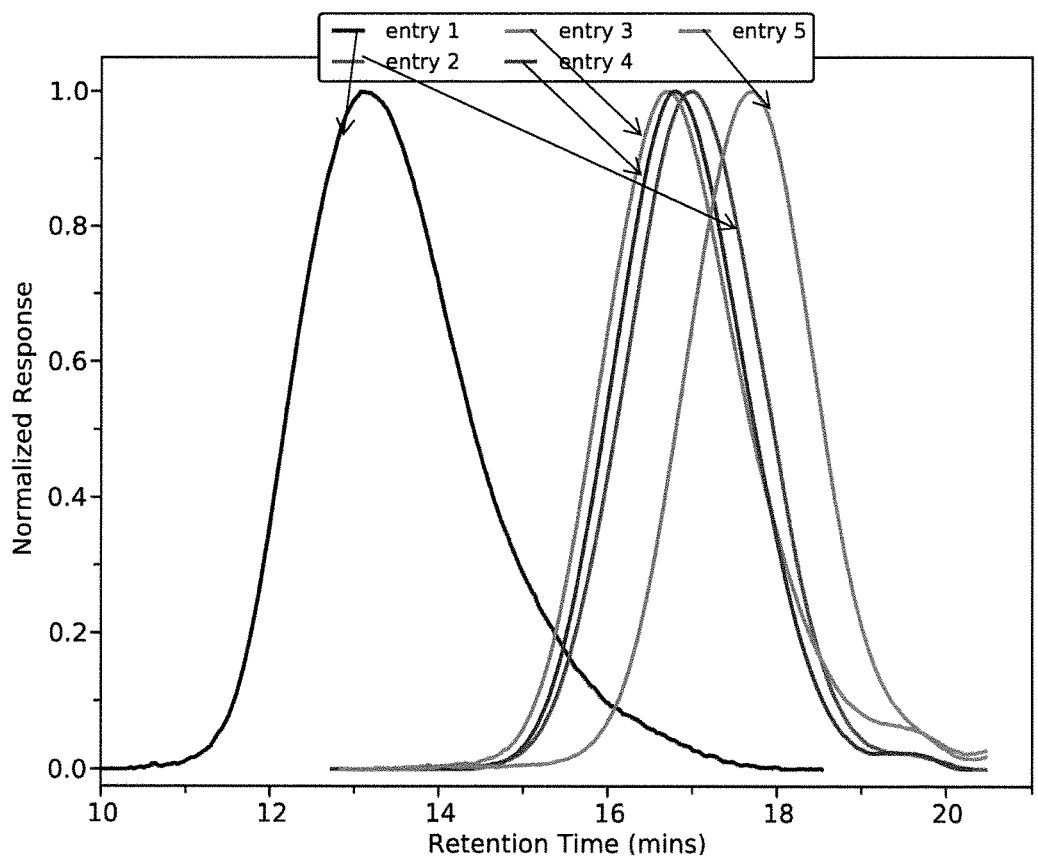
FIG. 9. GPC chromatograms for Table 1, entries 1-5.
Figure 10:
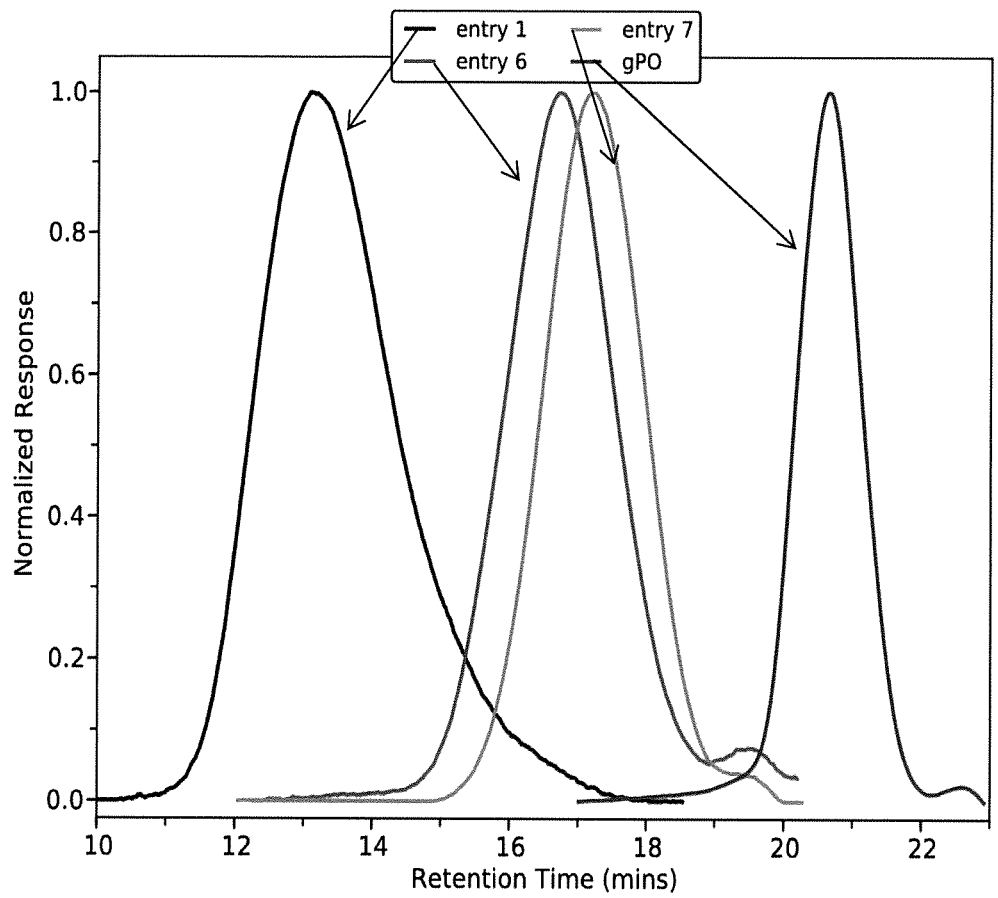
FIG. 10. GPC chromatograms for Table 1, entries 6-7.
Figure 11:
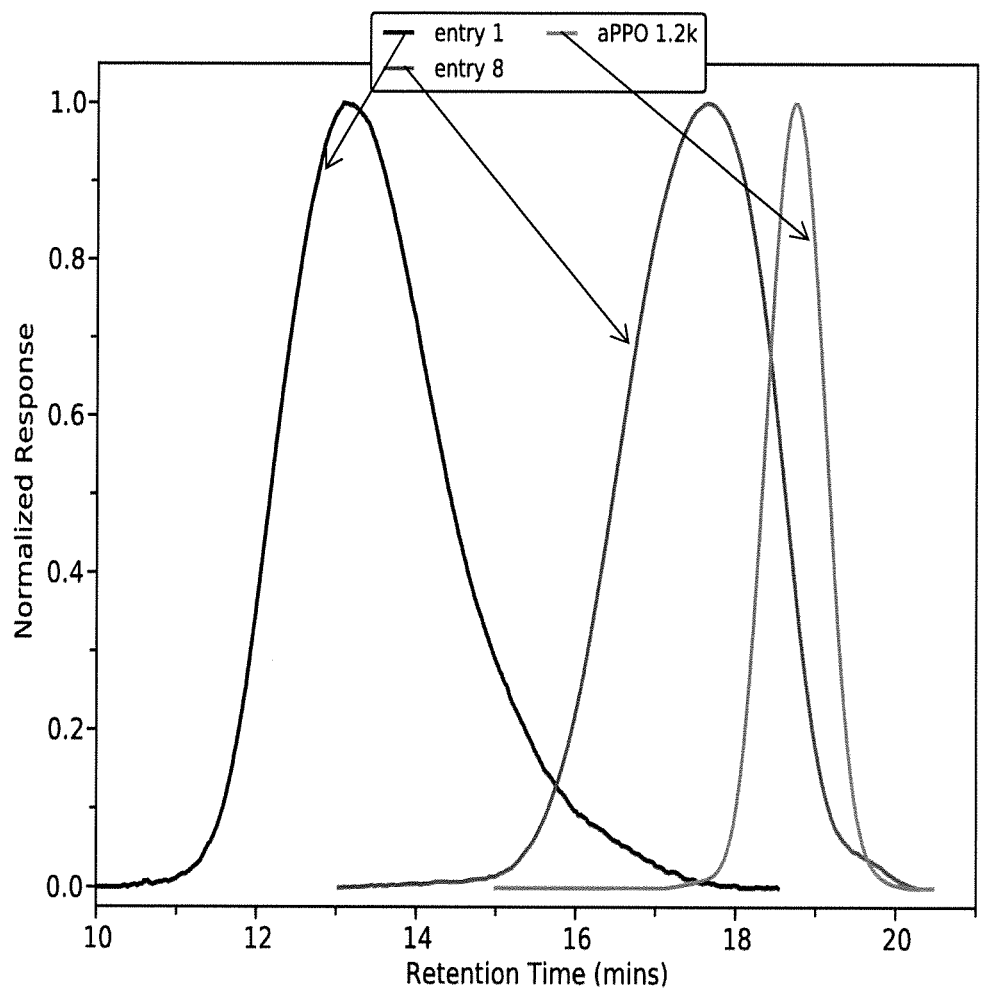
FIG. 11. GPC chromatograms for Table 1, entry 8.
Figure 12:
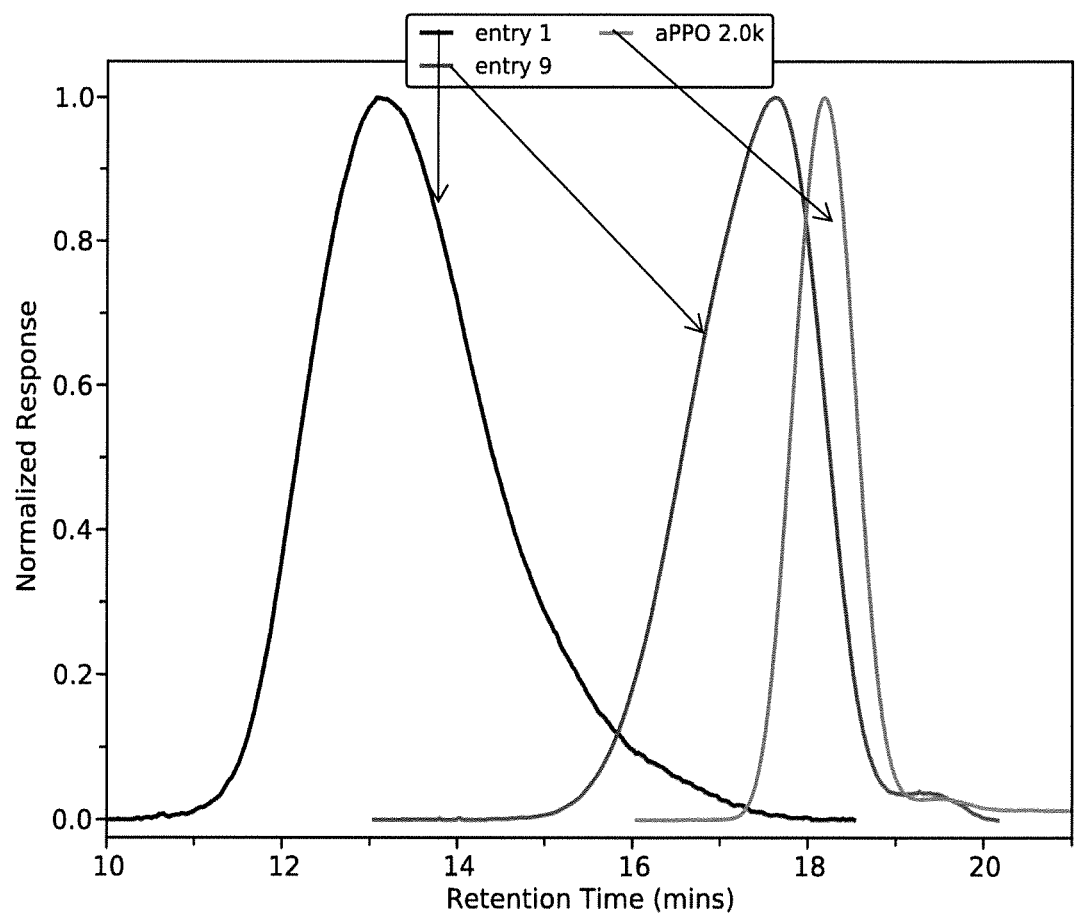
FIG. 12. GPC chromatograms for Table 1, entry 9.
Figure 13:
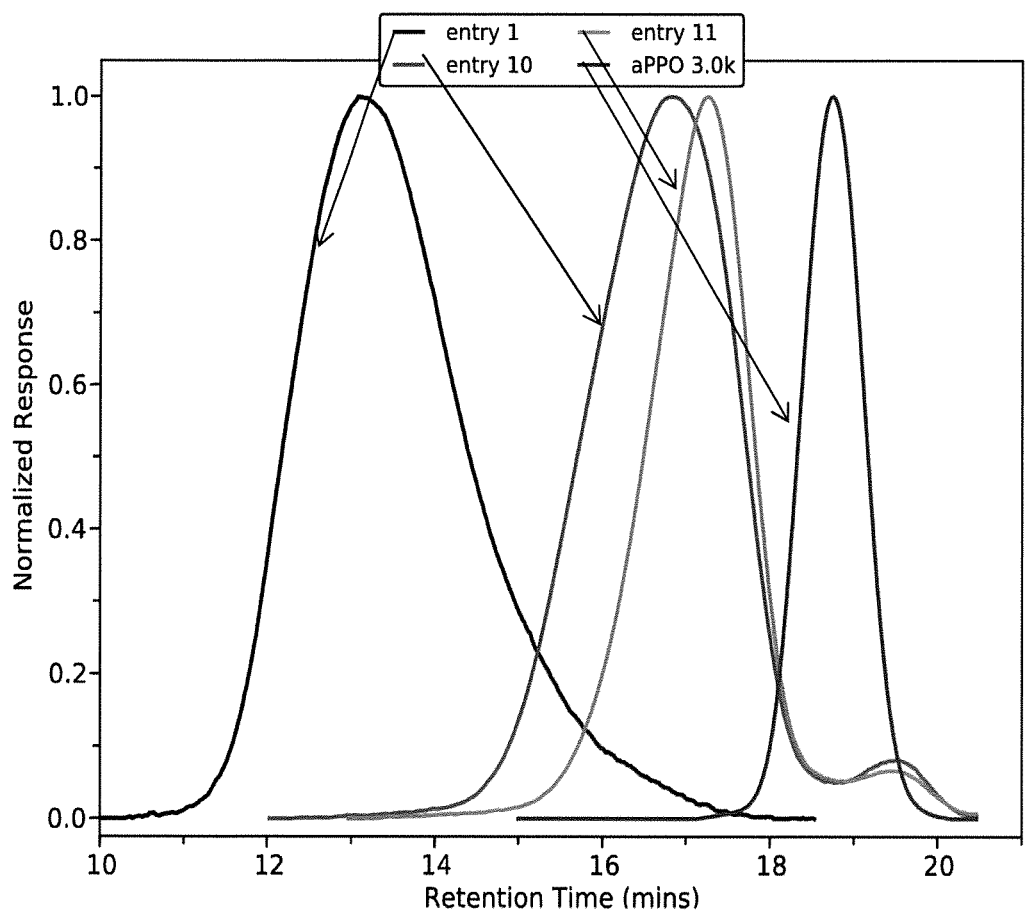
FIG. 13. GPC chromatograms for Table 1, entries 10-11.
Figure 14:
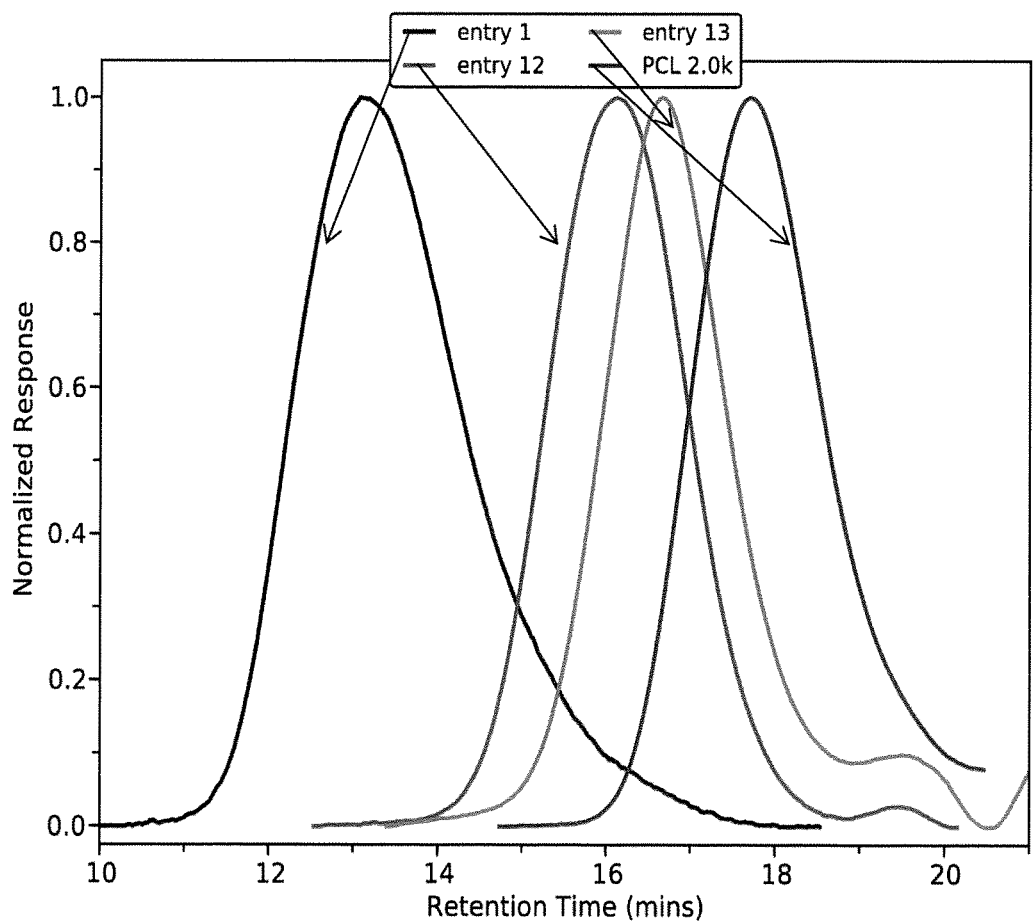
FIG. 14. GPC chromatograms for Table 1, entries 12-13.
Figure 15:
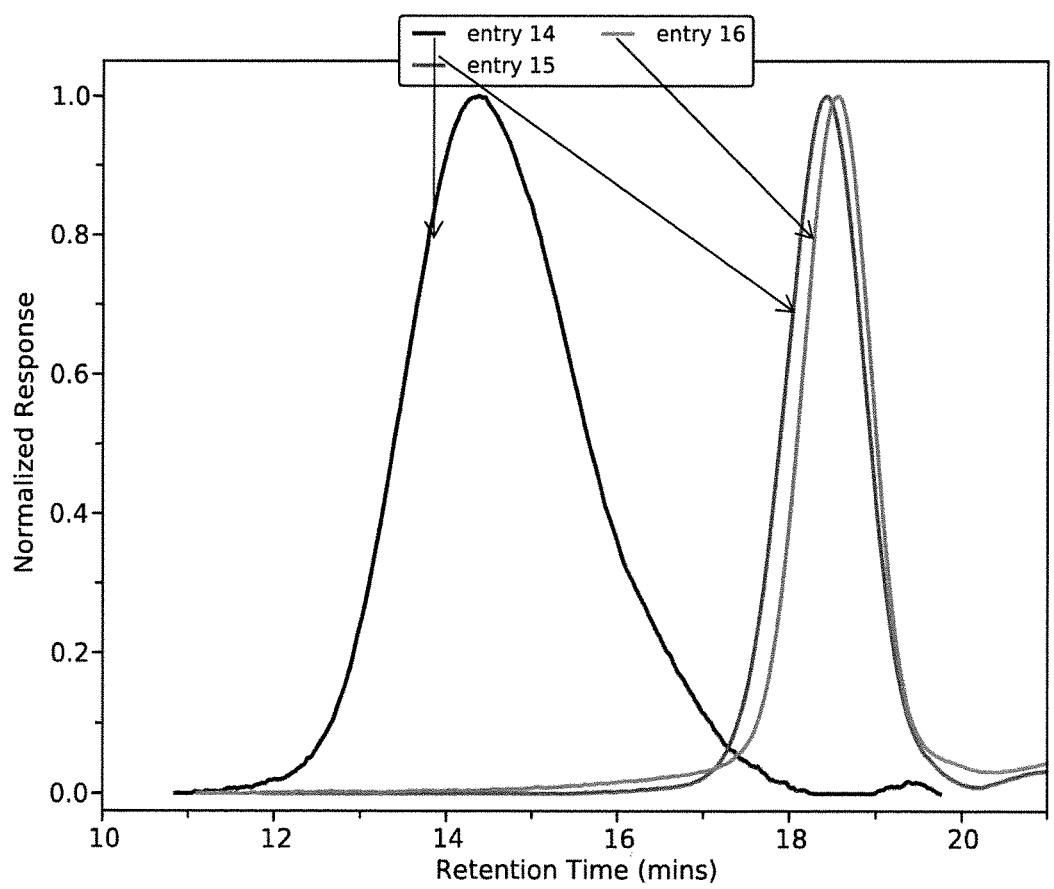
FIG. 15. GPC chromatograms for Table 1, entries 14-16.

Molecular Weight and Functionality in the Presence of CSAs. The use of multi-functional chain shuttling agents and mono-functional catalyst initiators leads to a bimodal distribution of polymer molecular weights and functionality. For example, in a hypothetical catalyst system with 1 catalyst, 4 difunctional CSAs, and 100 monomers (FIG. 8), and assuming ideal chain shuttling equally between each hydroxyl end group, the resulting polymer will be composed of 1 mono-functional polymer chain consisting of 100/9=11.1 monomers and 4 di-functional polymer chains consisting of (2×100/9)=22.2 monomers, for an overall $M_n$ of 20 monomers and an overall functionality of 1×1+4×2=9=1.8. As can be easily seen, as the number of chain shuttling agents increases relative to catalyst, the contribution of the mono-functional catalyst initiated polymer chains to the overall polymer molecular weight and functionality decreases. An ideal polymerization with 1 catalyst, 40 di-functional chain shuttling agents, and 4000 monomers will have a composition of 1 mono-functional polymer chain consisting of 4000/81=49.4 monomers and 40 di-functional chains consisting of (2×4000/41)=98.8 monomers, for an overall $M_n$ of 97.6 monomers and an overall functionality of (1×1+40×2)/41=81/41=1.975.

NMR Quantification of Polymer Tacticity. The polyethers synthesized in this paper exhibit triad resolution of the methine carbon, albeit with some overlap of the mr and rm peaks. Because of this overlap, [mr] and [rm] are ideally determined from [rr], but this is not possible when [mr]=[rm])>[rr]. Instead, the mm (δ=75.62 ppm), clearly visible $^{13}$C satellite upheld of mm, mr+rm (δ=75.46, 75.42 ppm), and rr (δ=75.22 ppm) peaks were integrated separately. The value of the integrated $^{13}$C satellite for the mm peak was doubled and added to the integrated value of the mm peak (Equation 3) for calculating [mm] (Equation 6), while its value was subtracted from the integral of the mr and rm peak to account for the downfield $^{13}$C satellite (Equation 4) for the calculation of ([mr]+[rm]) (Equation 7).

$$mm_{total} = \int mm + 2 \times \int mm_{satellite} \quad (3)$$

$$(mr + rm)_{total} = \int mr + \int rm - \int mm_{satellite} \quad (4)$$

$$rr_{total} = \int rr \quad (5)$$

$$[mm] = \frac{mm_{total}}{mm_{total} + (mr + rm)_{total} + rr_{total}} \quad (6)$$

-continued $$([mr]+[rm]) = \frac{(mr+rm)_{total}}{mm_{total}+(mr+rm)_{total}+rr_{total}} \quad (7)$$

$$[rr] = \frac{rr_{total}}{mm_{total}+(mr+rm)_{total}+rr_{total}} \quad (8)$$

Example for Table 1, Entry 2

$$mm_{total} = 887.38 + 2 \times 12.91 = 913.20$$
$$(mr+rm)_{total} = 94.24 - 12.90 = 81.33$$
$$rr_{total} = 20.37$$
$$[mm] = \frac{913.20}{913.20+81.33+20.37} = \frac{913.20}{1014.90} = 90.0$$
$$([mm]+[mr]) = \frac{81.33}{913.20+81.33+20.37} = \frac{81.330}{1014.90} = 8.0$$
$$[rr] = \frac{20.37}{913.20+81.33+20.37} = \frac{20.37}{1014.90} = 2.0$$

Hydroxyl Value Determination. The hydroxyl value for Table 1, entry 4 was determined using ASTM E222-10 "Standard Test Methods for Hydroxyl Groups Using Acetic Anhydride Acetylation", Test Method B (Reflux Method). The average hydroxyl value determined for 2 runs was 19.3 mg KOH/g polymer. The theoretical molecular weight for this polymer (calculated according to Equation 1) is 5754 g/mol polymer, the theoretical functionality is 1.992, and the $M_n$ NMR is 6027 g/mol polymer. The hydroxyl value for a 5754 g/mol polymer with a functionality of 1.992 is 19.4 mg KOH/g polymer. The functionality of the polymer calculated from the observed hydroxyl value and theoretical molecular weight is 1.98, while calculating it from the $M_n$ NMR gives a functionality of 2.07. The molecular weight, calculated according to the observed hydroxyl value and the theoretical functionality of 1.992, is 5787 g/mol polymer.

While the disclosure has been particularly shown and described with reference to specific embodiments (some of which are preferred embodiments), it should be understood by those having skill in the art that various changes in form and detail may be made therein without departing from the spirit and scope of the present disclosure as disclosed herein.

The invention claimed is:

1. A polymer comprising the structure:

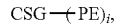

wherein CSG is a chain shuttling group and PE is an isotactic polyether group, and i is from 1 to 10,
the isotactic polyether group comprises at least 2 stereo-regular blocks having the following structure:

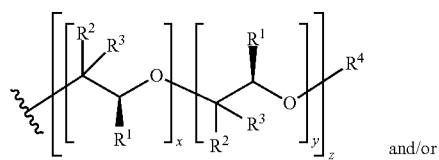

and/or

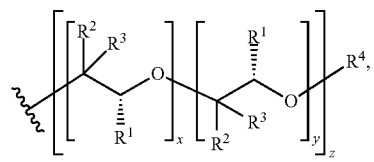

wherein $R^1$ is H or $C_1$ to $C_{20}$ aliphatic group, $R^4$ is H or $C_1$ to $C_{20}$ aliphatic group,

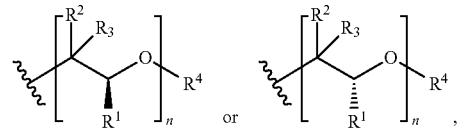

$R^2$ is H or a $C_1$ to $C_{20}$ aliphatic group, $R^3$ is H or a $C_1$ to $C_{20}$ aliphatic group, n is independently at each occurrence in the polyether group 5 to 500, x and y are independently at each occurrence in the polyether group 5 to 500, and z is greater than or equal to 1, and the mr-triad+rm-triad is greater than or equal to 2 times the rr-triad, and the $M_n$ of the polymer is from 500 to 500,000 g/mol.

2. The polymer of claim 1, wherein the chain shuttling group has one of the following structures:

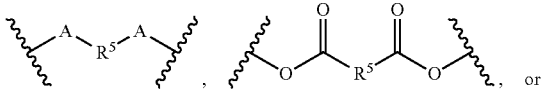

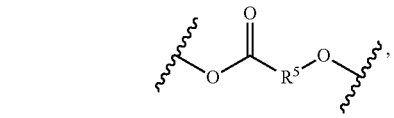

wherein A is O or S, $R^5$ is a $C_1$ to $C_{20}$ carbon-containing selected from the group consisting of a $C_1$ to $C_{20}$ aliphatic group, $C_1$ to $C_{20}$ heteroaliphatic group, $C_3$ to $C_{12}$ carbocyclic group, a $C_5$ to $C_{20}$ aliphatic carbocyclic group, $C_3$ to $C_{12}$ heterocyclic group, and a $C_5$ to $C_{20}$ aliphatic heterocyclic group.

3. The polymer of claim 1, wherein the $M_n$ of the polymer is from 500 to 30,000 g/mol.

4. The polymer of claim 1, wherein the PDI of the polymer is less than 2.

5. The polymer of claim 1, wherein the isotactic polyether group is polypropylene oxide.

6. A method of making a polymer of claim 1 comprising:
polymerizing an epoxide in the presence of a catalyst having the following structure:

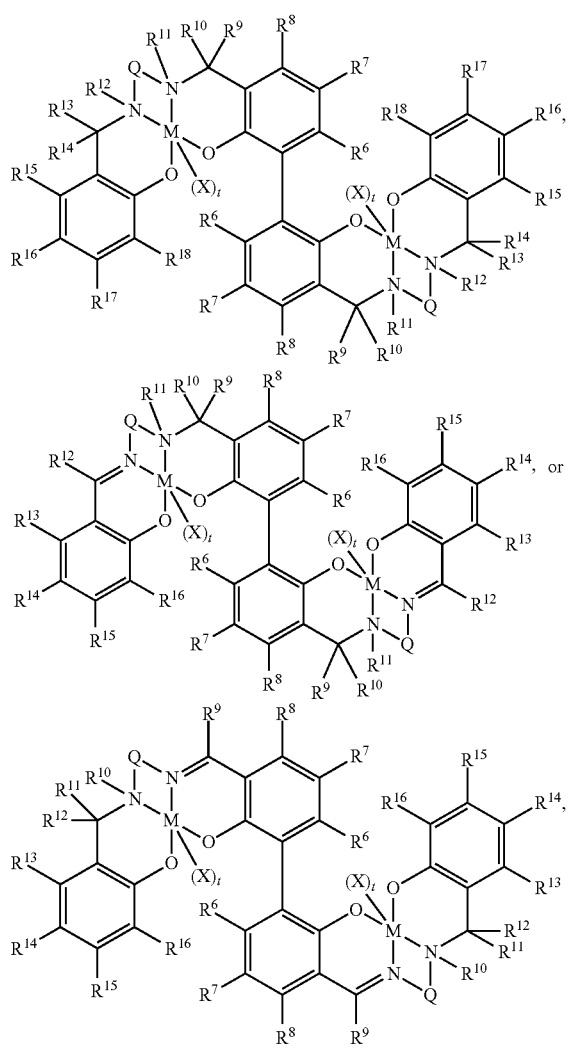

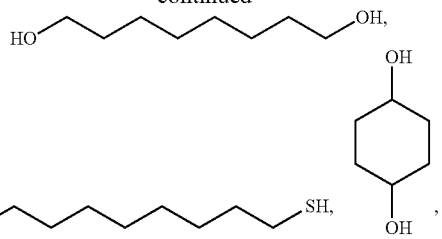

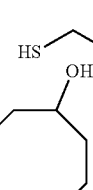

sugars, polysaccharides, glycerols, or hydroxyl or carboxyl functional polymers, wherein y is 1-100.

9. The method of claim 6, wherein the epoxide, catalyst, ionic co-catalyst, and multifunctional chain shuttling group are contacted in a solvent.

10. The method of claim 6, wherein the epoxide is a racemic epoxide or an enantiopure epoxide.

11. The method of claim 6, wherein the catalyst is a racemic catalyst or an enantiopure catalyst.

12. The method of claim 6, wherein the epoxide is a racemic epoxide and the catalyst is a racemic catalyst.

13. The method of claim 6, wherein the ionic co-catalyst is PPNCl, PPNBr, PPNI, PPNN$_3$, PPNOAc, or PPNOPiv.

14. A material comprising the polymer of claim 1 and a polyurethane, elastomer, thermoset plastic, or thermoplastic.

15. The method of claim 6, wherein the catalyst is selected from the following:

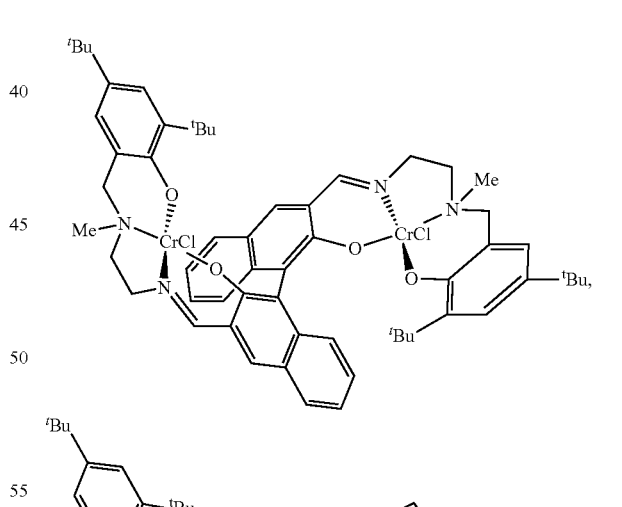

wherein M is a metal, X is a nucleophile or counterion, t is an integer from 0 to 2, Q is $C_1$ to $C_{20}$ aliphatic group, $C_5$ to $C_{20}$ aliphatic carbocyclic group, and each $R^6$ through $R^{18}$ independently are selected from the group consisting of hydrogen, $C_1$ to $C_{20}$ aliphatic group, halide, $C_1$ to $C_{20}$ alkoxide group, $C_6$ to $C_{20}$ aryl group, wherein, optionally, adjacent $R^6$, $R^7$, $R^8$, $R^9$, $R^{10}$, $R^{11}$, $R^{12}$, $R^{13}$, $R^{14}$, $R^{15}$, $R^{16}$, $R^{17}$, or $R^{18}$ groups taken together with their intervening atoms to form a saturated, partially unsaturated, or aromatic 5 to 12 membered ring containing 0 to 4 heteroatoms, 5 to 6 membered carbocyclic group, aryl group, or 5 to 7-membered heteroaryl group, wherein the rings or groups are substituted; and an ionic co-catalyst and/or a chain shuttling agent.

7. The method of claim 6, wherein the chain shuttling agent is a multifunctional chain shuttling agent is $R^{19}$—(COOH/OH)$_z$, wherein $R^{19}$ is $C_1$ to $C_{20}$ aliphatic group, or $C_1$ to $C_{20}$ carbocyclic group, and z is from 1 to 10.

8. The method of claim 7, wherein the multifunctional chain shuttling group is selected from

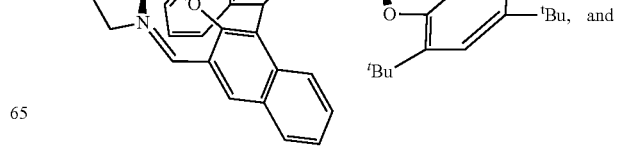

-continued

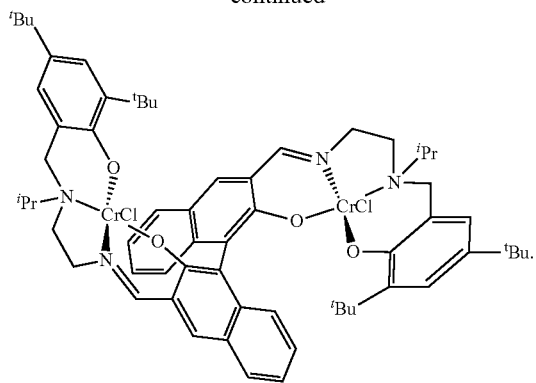

16. The method of claim 6, wherein the metal is Cr.

17. The method of claim 6, wherein Q is

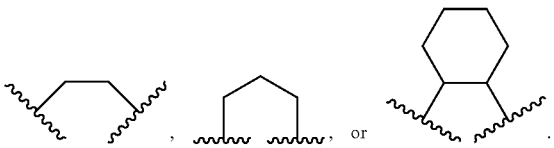

18. The method of claim 6, wherein X is Cl, Br, I, $N_3$, OAc, or OPiv.

19. The method of claim 6, wherein $R^{10}$, $R^{11}$, and/or $R^{12}$ is a $C_1$-$C_4$ alkyl group.

20. The method of claim 6, wherein $R^{10}$, $R^{11}$, and/or $R^{12}$ is a methyl group or an isopropyl group.

21. The method of claim 6, wherein the chain shuttling agent is a monoalcohol, a diol, a diacid, or a hydroxyacid.

22. The method of claim 1, wherein the mm-triad content of the isotactic polyether group is less than or equal to 94%.

* * * * *

UNITED STATES PATENT AND TRADEMARK OFFICE
CERTIFICATE OF CORRECTION

PATENT NO. : 10,711,101 B2
APPLICATION NO. : 15/525731
DATED : July 14, 2020
INVENTOR(S) : Coates et al.

Page 1 of 1

It is certified that error appears in the above-identified patent and that said Letters Patent is hereby corrected as shown below:

In the Claims

Column 36, Lines 52-65, in Claim 15, the structure should read:

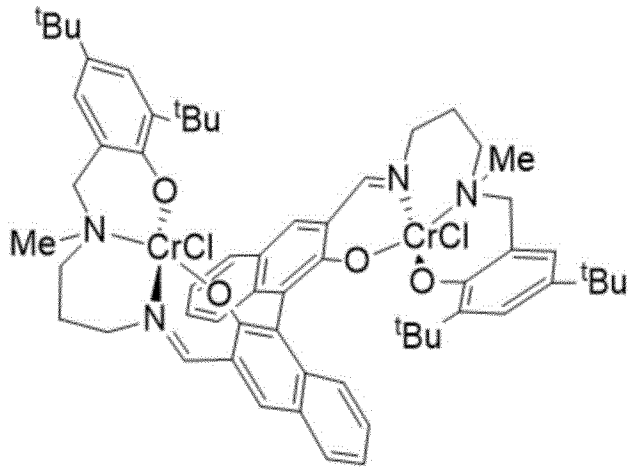

-- --

Signed and Sealed this
Eighth Day of June, 2021

Drew Hirshfeld
*Performing the Functions and Duties of the
Under Secretary of Commerce for Intellectual Property and
Director of the United States Patent and Trademark Office*